(12) United States Patent
Singh et al.

(10) Patent No.: US 12,527,561 B2
(45) Date of Patent: Jan. 20, 2026

(54) ELECTROCEUTICAL PATCH AND CATHETER SYSTEM AND USES THEREOF

(71) Applicants: Massachusetts Institute of Technology, Cambridge, MA (US); Nanyang Technological University, Singapore (SG)

(72) Inventors: Manisha Singh, Singapore (SG); Terry Steele, Singapore (SG); Ellen Roche, Cambridge, MA (US)

(73) Assignees: Massachusetts Institute of Technology, Cambridge, MA (US); Nanyang Technological University, Singapore (SG)

( * ) Notice: Subject to any disclaimer, the term of this patent is extended or adjusted under 35 U.S.C. 154(b) by 232 days.

(21) Appl. No.: 18/553,515

(22) PCT Filed: Mar. 31, 2022

(86) PCT No.: PCT/US2022/022830
§ 371 (c)(1),
(2) Date: Sep. 29, 2023

(87) PCT Pub. No.: WO2022/212709
PCT Pub. Date: Oct. 6, 2022

(65) Prior Publication Data
US 2024/0358360 A1    Oct. 31, 2024

Related U.S. Application Data

(60) Provisional application No. 63/169,733, filed on Apr. 1, 2021.

(51) Int. Cl.
A61B 17/00    (2006.01)
A61L 24/04    (2006.01)

(52) U.S. Cl.
CPC .... *A61B 17/0057* (2013.01); *A61B 17/00234* (2013.01); *A61L 24/046* (2013.01);
(Continued)

(58) Field of Classification Search
CPC .............. A61L 24/046; A61L 2420/06; A61B 17/00234; A61B 17/0057;
(Continued)

(56) References Cited

U.S. PATENT DOCUMENTS

| 5,617,876 A | 4/1997 | Van |
| 8,784,475 B2 | 7/2014 | Martinson et al. |

(Continued)

FOREIGN PATENT DOCUMENTS

| WO | 2012064402 A1 | 5/2012 |
| WO | 2017056056 A1 | 4/2017 |
| WO | 2019055434 A1 | 3/2019 |

OTHER PUBLICATIONS

International Search Report received for PCT Patent Application No. PCT/US2022/022830, mailed on Jan. 18, 2019., 4 pages.
(Continued)

*Primary Examiner* — Mohamed G Gabr
(74) *Attorney, Agent, or Firm* — Pabst Patent Group LLP

(57) ABSTRACT

A system containing an electroceutical patch (ePATCH) in combination with a catheter having retractable electrodes (CATRE) which can be used to treat tissue defects, such for the repair of lumen defects, is described herein. The system was shown to be able to seal lumen defects on both synthetic and wet tissue substrates.

41 Claims, 15 Drawing Sheets

(52) U.S. Cl.
CPC .............. *A61B 2017/00004* (2013.01); *A61B 2017/00137* (2013.01); *A61B 2017/00238* (2013.01); *A61B 2017/00305* (2013.01); *A61B 2017/00557* (2013.01); *A61B 2017/00575* (2013.01); *A61B 2017/0065* (2013.01); *A61B 2017/00836* (2013.01); *A61B 2017/00862* (2013.01); *A61B 2017/00867* (2013.01); *A61B 2017/00884* (2013.01); *A61B 2017/00938* (2013.01); *A61B 2017/00951* (2013.01); *A61L 2420/06* (2013.01)

(58) Field of Classification Search
CPC .......... A61B 2017/00004; A61B 2017/00137; A61B 2017/00238; A61B 2017/00305; A61B 2017/00557; A61B 2017/00575; A61B 2017/0065; A61B 2017/00836; A61B 2017/00862; A61B 2017/00867; A61B 2017/00884; A61B 2017/00938; A61B 2017/00951; A61M 25/10; A61N 1/05; A61N 1/37518
See application file for complete search history.

(56) References Cited

U.S. PATENT DOCUMENTS

| | | | |
|---|---|---|---|
| 10,869,748 | B2 | 12/2020 | Rosenberg et al. |
| 2016/0331861 | A1 | 11/2016 | Steele et al. |
| 2019/0192863 | A1 | 6/2019 | Koop et al. |
| 2019/0290923 | A1* | 9/2019 | Yeh ........................ A61B 5/686 |

OTHER PUBLICATIONS

Amateau, et al., "Avoidance, Recognition, and Management of Complications Associated with Lumen-Apposing Metal Stents", Gastrointest Endosc Clin N Am., vol. 28, No. 2, Apr. 2018, pp. 219-231.
Bemelman, et al., "Endoscopic Management of Transmural Defects, Including Leaks, Perforations, and Fistulae", Gastroenterology., vol. 154, No. 7, May 2018, pp. 1938-1946.e1.
Boutry, et al., "Biodegradable and flexible arterial-pulse sensor for the wireless monitoring of blood flow", Nat Biomed Eng., vol. 3, No. 1, Jan. 2019, pp. 47-57.
Cheong, et al., "An inductively powered implantable blood flow sensor microsystem for vascular grafts", IEEE Trans Biomed Eng., vol. 59, No. 9, Sep. 2012, pp. 2466-2475.
Gan, et al., "Self curing and voltage activated catechol adhesives", Chem Commun (Camb)., vol. 55, No. 68, Aug. 20, 2019, pp. 10076-10079.
Gan, et al., "Voltage-Activated Adhesion through Donor-Acceptor Dendrimers", Macromolecules., vol. 51, No. 17, 2018, pp. 6661-6672.
García-Herrera, et al., "Bending and pressurisation test of the human aortic arch: experiments, modelling and simulation of a patient-specific case", Comput Methods Biomech Biomed Engin., vol. 16, No. 8, 2013, pp. 830-839.
Horvath, et al., "Towards Alternative Approaches for Coupling of a Soft Robotic Sleeve to the Heart", Ann Biomed Eng., vol. 46, No. 10, Oct. 2018, pp. 1534-1547.
Jakus, et al., "Three-dimensional printing of high-content graphene scaffolds for electronic and biomedical applications", ACS Nano., vol. 9, No. 4, 2015, pp. 4636-4648.
Kim, et al., "Materials for multifunctional balloon catheters with capabilities in cardiac electrophysiological mapping and ablation therapy", Nat Mater., vol. 10, No. 4, Apr. 2011, pp. 316-323.
Konopelski, et al., "Electrocardiogram rats: a comparison to human", Physiol Res., vol. 65, No. 5, Nov. 23, 2016, pp. 717-725.
Maldonado, et al., "Initial successful management of type I endoleak after endovascular aortic aneurysm repair with n-butyl cyanoacrylate adhesive", J Vasc Surg., vol. 38, No. 4, Oct. 2003, pp. 664-670.
Nanda, et al., "Thrombogenic Responses from Electrocured Tissue Adhesives", ECS Transactions., vol. 77, No. 11, 2017, pp. 547-555.
Natta, et al., "Soft and flexible piezoelectric smart patch for vascular graft monitoring based on Aluminum Nitride thin film", Sci Rep., vol. 9, No. 1; 8392, Jun. 10, 2019, 10 pages.
Pashneh-Tala, et al., "The Tissue-Engineered Vascular Graft-Past, Present, and Future", Tissue Eng Part B Rev., vol. 22, No. 1, Feb. 2016, pp. 68-100.
Paszkowiak, et al., "Arterial wall shear stress: observations from the bench to the bedside", Vasc Endovascular Surg., vol. 37, No. 1, 2003, pp. 47-57.
Ping, et al., "Adhesive curing through low-voltage activation", Nat Commun., vol. 6, No. 8050, Aug. 18, 2015, 9 pages.
Politz, et al., "Late abdominal aortic aneurysm rupture after AneuRx repair: a report of three cases", J Vasc Surg., vol. 31, No. 3, Mar. 2000, pp. 599-606.
Roche, et al., "A light-reflecting balloon catheter for atraumatic tissue defect repair", Sci Transl Med., vol. 7, No. 306; 306ra149., Sep. 23, 2015, 12 pages.
Romero, et al., "Treatment of fistula-in-ano with cyanoacrylate glue with and without prior seton placement in rats", Acta Cir Bras., vol. 31, No. 6, Jun. 2016, pp. 377-381.
Santos, et al., "Improving Post-EVAR Surveillance with a Smart Stent-Graft", Lecture Notes in Computational Vision and Biomechanics., vol. 1, Mar. 2012, pp. 267-289.
Singh, et al., "Synergistic Voltaglue Adhesive Mechanisms with Alternating Electric Fields", Chemistry of Materials., vol. 32, No. 6, 2020, pp. 2440-2449.
Singh, et al., "Voltaglue Bioadhesives Energized with Interdigitated 3D-Graphene Electrodes", Adv Healthc Mater., vol. 7, No. 21; e1800538, Nov. 2018, 13 pages.
Singh, et al., "Voltaglue Electroceutical Adhesive Patches for Localized Voltage Stimulation", ACS Appl Bio Mater., vol. 2, No. 6, Jun. 17, 2019, pp. 2633-2642.
Taboada, et al., "Overcoming the translational barriers of tissue adhesives", Nature Reviews Materials., vol. 5, 2020, pp. 310-329.
Vennemann, et al., "A smartphone-enabled wireless and batteryless implantable blood flow sensor for remote monitoring of prosthetic heart valve function", PLoS One., vol. 15, No. 1; e0227372, Jan. 14, 2020, 20 pages.
Wan, et al., "Endovascular coil embolization of aneurysm neck for the treatment of ruptured intracranial aneurysm with bleb formation", Med Sci Monit., vol. 2, No. 20, Jul. 2, 2014, pp. 1121-1128.
Xue, et al., "Ultra-low-power wireless implantable blood flow sensing microsystem for vascular graft applications", IEEE, 2011 International Symposium on Integrated Circuits, 2011, pp. 224-229.
Yoshida, et al., "Adhesive strength of autologous fibrin glue", Biol Pharm Bull., vol. 23, No. 3, Mar. 2000, pp. 313-317.

* cited by examiner

ELECTROCEUTICAL PATCH AND CATHETER SYSTEM AND USES THEREOF

CROSS-REFERENCE TO RELATED APPLICATION

The present application is a National Phase application under 35 U.S.C. 371 of PCT/US2022/022830, filed Mar. 31, 2022, which claims the benefit of and priority to U.S. Application No. 63/169,733, filed Apr. 1, 2021, the disclosures of which are incorporated herein by reference in their entirety.

FIELD OF THE INVENTION

This invention is in the field of tissue repair, particularly lumen defects, using minimally invasive electroceutical systems.

BACKGROUND OF THE INVENTION

Tissue defects occur across blood vessels and gastrointestinal tracts and range in severity from life-threatening (e.g. aneurysms) to chronic defects causing prolonged infections (e.g. fistulas in tracheotomy repair). Such lumen defects range from acute micro-perforations to chronic transmural leaks and are associated with most tubular internal organs. Colonoscopic perforation, aortic aneurysms, tracheoesophageal fistula, missed enterotomy, ureterovaginal malformations are some examples of lumen defects. Treatments of such defects generally rely on invasive open surgeries which can risk more complications.

Advances in endoscopic approaches can minimize invasive risks but are largely limited to mechanical fixation techniques such as metallic clipping and stenting. The mismatch of metallic and soft materials can erode soft tissues with perforation, tissue necrosis, and local inflammation (Bemelman, W. A., et al., Endoscopic Management of Transmural Defects, Including Leaks, Perforations, and Fistulae. Gastroenterology 2018, 154 (7), 1938-1946 el: Amateau, S. K., et al., Avoidance, Recognition, and Management of Complications Associated with Lumen-Apposing Metal Stents. Gastrointest Endosc Clin N Am 2018, 28 (2), 219-231). For example, the ANEURXR stent-graft addresses aneurysms via an endovascular approach (Politz, J. K., et al., Late abdominal aortic aneurysm rupture after AneuRx repair: A report of three cases. Journal of Vascular Surgery 2000, 31 (3), 599-606). ANEURXR relies on the available fixation technologies like metallic hooks and tines that perforate soft tissues. Another endoscopic platform involves coil embolization with metallic wires until the defect sac is full (Wan, J., et al., Endovascular coil embolization of aneurysm neck for the treatment of ruptured intracranial aneurysm with bleb formation. Med Sci Monit 2014, 20, 1121-1128). These devices rely on metallic components that traumatize nearby soft tissues and results in necrosis.

As noted above, surgical repair of lumen defects (transmural perforation and fistula) is associated with periprocedural morbidity and mortality. While tissue adhesives have been used to diminish intraoperative and postoperative complications, existing designs are incapable of event activation on-site, especially within the limited operating environments of catheters. For example, (i) cyanoacrylate-based adhesives rapidly polymerize in presence of water, making them unsuitable for site-specific activation: (ii) fibrin-based sealants and other two-part adhesives are viscous and require complex mixing chambers that prevent catheter incorporation or repositioning; and (iii) on-demand photocuring adhesives require light intensities higher than fiber optics are typically engineered for and possess optical challenges of minimum bend radius and isotropic scattering (Roche, E. T., et al., A light-reflecting balloon catheter for atraumatic tissue defect repair. Sci Transl Med 2015, 7 (306), 306ra149). Endoscopic repair with tissue adhesives could reduce host tissue damage, but current bioadhesive designs do not support minimally invasive deployment. Existing two-component bioadhesives, for example, are too viscous to be injected into low profile catheter lumens that are often less than 1 mm in diameter.

Thus, there remains a need for options to replace, for example, rigid mechanical or suture-based attachments with flexible biomaterials, as well as a need for suitable tissue adhesives which can avoid the need to use traumatic anchoring with sutures or hooks resulting in extended and undesirable recovery times (Romero, G. T., et al., Treatment of fistula-in-ano with cyanoacrylate glue with and without prior seton placement in rats. Acta Cir Bras 2016, 31 (6), 377-81: Maldonado, T. S., et al., Initial successful management of type I endoleak after endovascular aortic aneurysm repair with n-butyl cyanoacrylate adhesive. Journal of Vascular Surgery 2003, 38 (4), 664-670; Taboada, G. M., et al., Overcoming the translational barriers of tissue adhesives. Nature Reviews Materials 2020).

Therefore, it is an object of the present invention to provide adhesive platforms which possess the ability to adhere to tissues and defects thereon.

It is another object of the present invention to provide ways to deliver such adhesive platforms to tissue using minimally invasive methods and to allow the adhesive of the platform to be activated both on-demand and on-site.

It is a further object of the present invention to provide methods which can be used to repair tissue defects using the adhesive platforms using the means for delivering and on-demand activation described.

SUMMARY OF THE INVENTION

A system for treating tissue defects includes an electroceutical patch and a catheter capable of delivering an electrical stimulus to the electroceutical patch to activate an electrochemically initiated bioadhesive present on and/or in the electroceutical patch.

The electroceutical patch of the system includes: (1) a biocompatible substrate: (2) an anode and a cathode, which are both on a same surface of the biodegradable substrate; and (3) an electrochemically initiated bioadhesive coating and in contact with both the anode and the cathode. FIG. 3A shows an exemplary representation of the electroceutical patch of the system.

The catheter of the system includes: (1) a main shaft optionally comprising a guidewire: (2) an anode shaft comprising a retractable (optionally shape-memory) metal anode wire end: (3) a cathode shaft comprising a retractable (optionally shape-memory) metal cathode wire end; (4) a balloon inflation port; and (5) an inflatable balloon on an end portion of the catheter.

The electroceutical patch and catheter system can treat tissue defects, such as lumen defects, in a subject in need thereof where the electroceutical patch delivered by the catheter is activated on demand and becomes adhered to the tissue defect. Exemplary lumen defects include, without limitation, an endoluminal defect, a blood vessel defect (i.e., artery or vein defect), an ear canal defect, an aorta defect (i.e., an aortic aneurysm), a gastrointestinal defect, a broncheal defect, a lymph tissue defect (i.e., lymph node defect), an esophogeal defect, a tracheal defect, a fistula, a colonoscopic perforation, an esophageal defect, an enterotomy, an intracardiac defect, or an ureterovaginal malformation. In some instances, the electroceutical patch adhered to the tissue defect acts as a scaffold allowing for tissue repopulation and healing of the tissue defect. In still other instances, the system can be used for attaching the electroceutical patch to the outside of the heart or a vessel or an organ or any tissue (even a tumor) for purposes of reinforcement of the heat, vessel, organ, or tissue.

The electroceutical patch and catheter system can be used in the treatment of tissue defects in order to seal and/or repair the tissue defect. In some instances, a method of treating a tissue defect in a subject in need thereof using the system includes the steps of:

(1) inserting the electroceutical patch and the catheter of the system into the subject in need thereof having a tissue defect;
(2) delivering the electroceutical patch present on the inflatable balloon of the catheter to the tissue defect;
(3) inflating the inflatable balloon to press the electroceutical patch onto the tissue defect: where the electroceutical patch covers the tissue defect;
(4) activating the electrically initiated bioadhesive on the electroceutical patch in order to adhere the electroceutical patch onto the tissue defect;
wherein activating includes delivering an electrical current to the anode and the cathode of the electroceutical patch via the retractable (optionally shape-memory) metal anode and cathode wires from the electrical source;
wherein when the retractable metal anode and cathode wires are made of or contain shape-memory metal, the electrical current induces electrical resistance heating of the retractable shape-memory metal anode and cathode wires and the wires are straightened and straightening occurs prior to or simultaneously with electro-curing of the electrically initiated bioadhesive;
(5) retracting the straightened retractable (optionally shape-memory) metal anode and cathode wires from the electroceutical patch adhered to the tissue defect;
wherein retracting causes the retractable (optionally shape-memory) metal anode and cathode wires to separate and disconnect from the electroceutical patch thereby freeing the electroceutical patch which remains adhered/attached to the tissue defect and can remain thereon;
(6) deflating the inflatable balloon; and
(7) withdrawing the catheter part of the system from the subject.

The treatment methods can be used to treat various types of tissue defects, such as in lumen defects. Exemplary tissue or lumen defects include, but are not limited to, an endoluminal defect, a blood vessel defect (i.e., artery or vein defect), an ear canal defect, an aorta defect (i.e., an aortic aneurysm), a gastrointestinal defect, a broncheal defect, a lymph tissue defect (i.e., lymph node defect), an esophogeal defect, a tracheal defect, a fistula, a colonoscopic perforation, an esophageal defect, an enterotomy, intracardiac defect, or an ureterovaginal malformation.

BRIEF DESCRIPTION OF THE DRAWINGS

FIGS. 2A-2G are a non-limiting depiction of the procedural steps of using system 100 for treating (repairing) an endoluminal tissue defect by sealing showing: (2A, i) insertion of the system to a tissue defect via guidewire: (2B, ii) delivery of the electroceutical patch (ePATCH) to the tissue defect: (2C, iii) balloon inflation: (2D, iv) ePATCH activation using voltage/current: (2E, v) ePATCH release by retraction of the cathode and anode wires; and (2G, vi) adherence of the ePATCH to the tissue defect.

DETAILED DESCRIPTION OF THE INVENTION

Figure 1A:
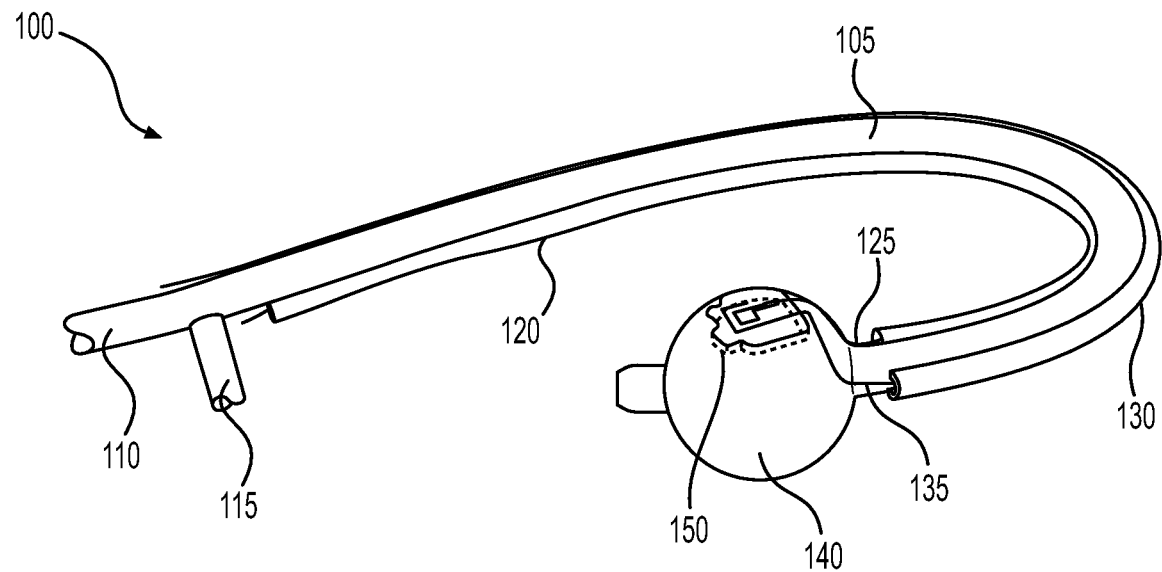
FIG. 1A is a non-limiting representation of system 100 for treating tissue defects containing functional components including: a main shaft 105, guidewire route 110, balloon inflation port 115 on the main shaft, cathode shaft 120, retractable cathode wire 125, anode shaft 130, retractable anode wire 135, balloon 140, and electroceutical patch 150.

A system for treating tissue defects which contains an electroceutical patch and a catheter for delivering the patch to a tissue defect, such as inside a lumen. The catheter contains retractable anode and cathode wires which are capable of electrically activating an electrochemically initiated bioadhesive present on the electroceutical patch when the patch contacts the tissue defect, thereby causing the patch to adhere to the tissue defect.

I. Definitions

"Conformable," "Compliant," or "Compliance," are used interchangeably herein, and refer to the ability of a material to conform or deform to the asperities, curvature (such as curvilinear), and/or nonplanarity of an adjoining surface(s) when contacted, typically under an applied pressure (i.e., compression force), to the one or more adjoining surface(s).

"Flexible," as used herein, refers to the ability to deform/conform in response to an applied force, strain, or stress.

"Elastomer," as used herein, refer to a crosslinked network polymer, which has viscoelastic properties.

"Crosslink," as used herein, refers to a chemical connection between polymer or oligomer chains which may be a covalent chemical bond, an ionic chemical interaction, a physical chemical interaction, such as a chain entanglement, interchain hydrogen bonding. A crosslink may, as one example, be formed by reaction of a group in one polymer or oligomer strand with a group of a different polymer or oligomer strand. A plurality of crosslinks may exist between separate polymer or oligomer strands and may also exist between different points of the same polymer or oligomer.

"Electrocurable," "electrocuring," and "electrocured," as used herein, refers to the ability to activate an electrochemically initiated adhesive on-demand by applying a voltage or current is raised above a threshold to the electrochemically initiated adhesive. As the voltage or current surpasses the threshold value, electrochemically activated functional groups contained in the electrochemically initiated adhesive are reduced or oxidized into another functional group capable of crosslinking the polymer or oligomer backbones or functional groups therein, thereby rendering it adhesive and capable of adhering to synthetic or natural materials, such as a tissue such as porcine myocardium, swine aorta, porcine carotid artery, swine epicardium, and rat pericardium, thermoplastic elastomer, protein such as collagen, polymer such as poly-L-lactide, or a polysaccharide such as cellulose, which is or comes in contact with the activated electrochemically initiated adhesive.

"Biocompatible", as used herein, refers to materials that are, along with any metabolites or degradation products thereof, generally non-toxic to the recipient, and do not cause any significant adverse effects to the recipient, at concentrations resulting from the degradation of the administered materials. Generally speaking, biocompatible materials are materials should not elicit an inappropriate inflammatory or immune response when administered to a patient.

"Biodegradable," as used herein, refers to a material that can be degraded or eroded by enzymatic action or hydrolysis under physiologic conditions into smaller units or chemical species of the original material that are capable of being metabolized, eliminated, or excreted by a subject.

"Bioresorbable," as used herein, refers to a material that can be absorbed by the body so that the components from which it is made dissolve, degrade, and/or are absorbed by the body.

"Shape memory metal," as used herein, refers to a metal alloy, typically in wire form, which can be deformed from an original shape and which exhibits a thermal shape-memory effect when exposed to heat energy causing them to return to their original shape.

The terms "treatment" and "treating" refer to the medical management of a subject with the intent to repair, cure, ameliorate, and/or stabilize a defect and/or damage present in a tissue, such as those present in lumen. This term includes active treatment toward the improvement of the defect and/or damage present in tissue, or palliative treatment designed for the relief of symptoms rather than intended for curing of the defect and/or damage present in tissue: preventative treatment is directed to minimizing or partially or completely inhibiting the development of a defect and/or damage to tissue prone to formation of a defect and/or damage. It is understood that treatment, while intended to repair, cure, ameliorate, and/or stabilize a defect and/or damage present in tissue, need not actually result in any particular degree of repair, cure, amelioration, stabilization, and/or prevention.

As used herein, the terms "oligomer" and "polymers" each refer to a compound of a repeating monomeric subunit. Generally speaking, an "oligomer" contains fewer monomeric units than a "polymer."

Numerical ranges include ranges of thicknesses, ranges of pressures, ranges of molecular weights, ranges of integers, ranges of times, ranges of electric current, ranges of length, ranges of diameters, etc. The ranges disclose individually each possible number that such a range could reasonably encompass, as well as any sub-ranges and combinations of sub-ranges encompassed therein. For example, an activating step may be carried out for a period of time in the range of about 1 min to 10 min, also refers to time values that can be selected independently from about 2, 3, 4, 5, 6, 7, 8, and 9 minutes, as well as any range between these numbers (for example, 3 min to 8 min), and any possible combination of ranges between these time values.

The term "about" or "approximately" as used herein generally means within 20%, preferably within 10%, and more preferably within 5% of a given value or range. The term "about x" further includes x.

II. Electroceutical Patch and Catheter Systems

A system for treating tissue defects includes an electroceutical patch and a catheter capable of delivering an electrical stimulus to the electroceutical patch to activate an electrochemically initiated bioadhesive present on and/or in the electroceutical patch.

Figure 3A:
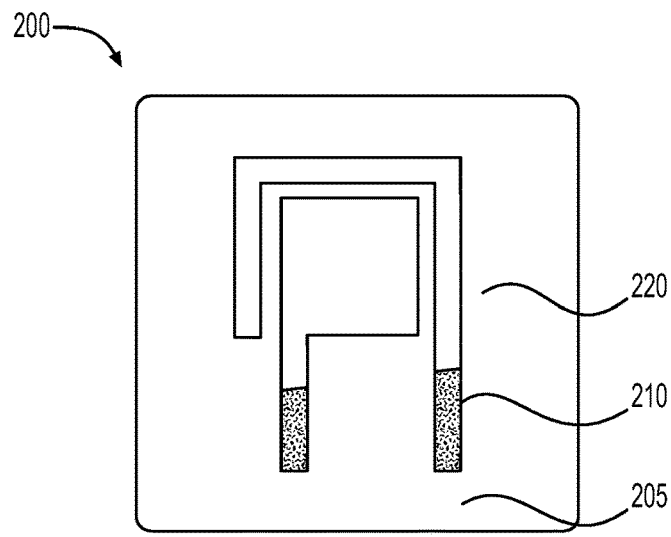
FIG. 3A is a non-limiting representation of an electroceutical patch (ePATCH) 200 containing a biocompatible substrate 205, electrodes 210 on the substrate, and a layer of electrochemically initiated bioadhesive 220 over the electrodes.

The electroceutical patch of the system includes: (1) a biocompatible substrate: (2) an anode and a cathode, which are both on a same surface of the biodegradable substrate; and (3) an electrochemically initiated bioadhesive coating and in contact with both the anode and the cathode. FIG. 3A shows an exemplary representation of the electroceutical patch of the system.

The catheter of the system includes: (1) a main shaft optionally comprising a guidewire: (2) an anode shaft comprising a retractable (optionally shape-memory) metal anode wire end: (3) a cathode shaft comprising a retractable (optionally shape-memory) metal cathode wire end; (4) a balloon inflation port; and (5) an inflatable balloon on an end portion of the catheter.

FIG. 1A shows an exemplary representation of the system 100 for treating tissue defects containing functional components including: a main shaft 105, guidewire route 110, balloon inflation port 115 on the main shaft, cathode shaft 120, retractable cathode wire 125, anode shaft 130, retractable anode wire 135, balloon 140, and electroceutical patch 150. FIG. 1A shows the system with the balloon being inflated. For the system, however, the balloon 140 is uninflated until the electroceutical patch 150 needs to be contacted to a tissue defect inside a lumen by inflating the balloon. The electroceutical patch is preferably coiled or wrapped around the uninflated balloon and can be held on the balloon by the retractable anode and cathode wires which can wrap around the electroceutical patch. For example, the wires can be threaded into pre-defined holes in the patch and the wire/patch assembly can be coiled or wrapped around the balloon intertwined with the patch to secure it in place.

A non-limiting depiction of the procedural steps of using system 100 for treating a tissue defect (an endoluminal defect) by sealing is shown in FIG. 2 and includes the steps of: (i) insertion of the system to a tissue defect via guidewire: (ii) delivery of the electroceutical patch (ePATCH) to the tissue defect: (iii) balloon inflation; (iv) ePATCH activation using voltage/current: (v) ePATCH release by retraction of the cathode and anode wires; and (vi) adherence of the ePATCH to the tissue defect. Once the ePATCH is electrically activated and has adhered onto the tissue defect, the catheter is removed. The ePATCH remains attached to the tissue defect to treat the defect, such as by sealing the defect and allowing the tissue defect to be repaired by the body.

The electroceutical patch and catheter system can treat tissue defects, such as lumen defects, in a subject in need thereof where the electroceutical patch delivered by the catheter is activated on demand and becomes adhered to the tissue defect. Tissue defects or lumen defects that can be treated can have a size of between about 1 up to 20 mm and any possible size or sub-range within. Exemplary lumen defects include, without limitation, an endoluminal defect, a blood vessel defect (i.e., artery or vein defect), an ear canal defect, an aorta defect (i.e., an aortic aneurysm), a gastrointestinal defect, a broncheal defect, a lymph tissue defect (i.e., lymph node defect), an esophogeal defect, a tracheal defect, a fistula, a colonoscopic perforation, an esophageal defect, an enterotomy, an intracardiac defect, or an ureterovaginal malformation. In some instances, the electroceutical patch adhered to the tissue defect acts as a scaffold allowing for tissue repopulation and healing of the tissue defect. In still other instances, the system can be used for attaching the electroceutical patch to the outside of the heart or a vessel or an organ or any tissue (even a tumor) for purposes of reinforcement of the heat, vessel, organ, or tissue.

In some instances, the system may optionally have sensing and/or actuation functionality incorporated therein. The sensing or actuation functionality can be included in the electroceutical patch, catheter, or both components of the system. For example, the electrode wires of the catheter described below, which connect to the electrode and cathode of the electroceutical patch, or other additional wires which could be included in the system, can be used for sensing and/or to induce actuation. Typical parameters that could be sensed include, for example, temperature, blood flow, pressure (blood pressure and pressure applied by the catheter), optical sensing, voltage sensing (for arrhythmias and ablation procedures). Exemplary sensing which can be included in the systems is described, for example, in D.-H. Kim et al., Materials for multifunctional balloon catheters with capabilities in cardiac electrophysiological mapping and ablation therapy. Nature Materials 10, 316-323 (2011).

As described herein, a flexible electroceutical device is formed by polymerization of electrochemically initiated bioadhesive on an electroceutical patch placed at a site in need of repair to repair luminal defects. In some embodiments the electroceutical patch can include one or more sensors. These sensors can be used to monitor flow of liquids, especially blood, failure of the electroceutical patch and obstructions at the site.

Remote accessible sensors which can be incorporated into or onto the electroceutical patch are known to those skill in the art. See, for example, Santos et al., "Improving post-EVAR surveillance with a smart stent graft, Technologies for medical sciences, Book Series: Lecture Notes in Computational Vision and Biomechanics, Chapter 14, vol. 1 (Natal Jorge, R. M.: Tavares, J. M. R. S.; Pinotti Barbosa, M.: Slade, A. P., Eds.) (2012). Santos et al., describe three commercially available products that can be placed on or alongside a graft to measure the pressure of the blood within the aneurismal sac, and the relative benefits and detriments of each product. First, Santos et al. describes a system (the "Impressure AAA sac pressure transducer") that includes a piezoelectric membrane and a transducer. Upon activation of the transducer, the piezoelectric component can be used to sense a signal from an acoustic signal. The acoustic signal, therefore, must be applied directly to a portion of the patient where an ultrasonic signal can reach the graft. Because ultrasonic signal does not travel through bone or air, the Impressure AAA sac pressure transducer is cumbersome to use. Second, Santos et al. describes a system ("EndoSure wireless pressure sensor") that includes two conductive coils held in a pressure sensitive matrix. As the pressure changes in the aneurismal sac, the relative inductance and resonant frequency of these coils changes, and can be measured by a remote sensor. Although the EndoSure wireless pressure sensor does not require acoustic signal transmission to a detector, it does require specialized detection equipment and therefore would not typically be used continuously. Rather, the EndoSure wireless pressure sensor would typically only be used for occasional checkups. Furthermore, EndoSure can only measure absolute pressure, and not any particular portion in which pressure is higher or lower. Third, Santos describes a system ("TPS telemetric pressure sensor") in which a capsule is installed adjacent to the graft. In the event that an endoleak or other failure occurs and pressure rises in the aneurismal sac, the capsule can detect that change in pressure and transmit an appropriate signal. Installation of a separate capsule increases complexity and requires suturing to the outer wall of the graft, potentially introducing failure sites.

It is desirable to provide a means for repairing a tissue defect using the electroceutical patch of the system that does not include or introduce additional failure modes or increases complexity of manufacturing. It is further desirable to provide a means for repairing a tissue defect that does not require use of ultrasound, has continuous monitoring capabilities, and can detect where the high pressure is located relative to the repair site. For example, Santos et al. describes a graft including deformable sleeves that include an electrical component which can be a variable-resistance or piezoelectric material in certain embodiments, or other electric material, such as one containing carbon nanotubes, silver nanoparticles, gold nanoparticles, or other biologically compatible materials for which deformation of the sleeves due to pressure changes create or modify an electrical signal. A transponder can then transmit information relating to the pressure inside and outside of the vascular graft. The electroceutical patches described herein can be modified to respond pressure changes and create or modify a signal, such as an electrical signal, which can transmit the information for detection and analysis by suitable means (i.e., via a transponder). More recent reports on various types of sensors that could be used include the following: See "A new sensor could make it easier to monitor blood flow after surgery—The wireless, battery-free, biodegradable device doesn't need to be removed and it can warn a patient's doctor if there is a blockage" reported in Stanford Engineering Jan. 14, 2019 by Taylor Kubota, described a biodegradable and flexible arterial-pulse sensor for the wireless monitoring of blood flow. The sensor is operated wirelessly through inductive coupling, has minimal hysteresis, fast response times, excellent cycling stability, is highly robust, allows for easy mounting and eliminates the need for removal. See Boutry, et al. Nature Biomed. Engin. 3, 47-57 (2019): Vennemann B, Obrist D, Rösgen T (2020) reports on "A smartphone-enabled wireless and battery less implantable blood flow sensor for remote monitoring of prosthetic heart valve function" PLOS ONE 15 (1): e0227372. https://doi.org/10.1371/journal.pone.0227372. See also, Natta, L., Mastronardi, V. M., Guido, F. et al. "Soft and flexible piezoelectric smart patch for vascular graft monitoring based on Aluminum Nitride thin film. Sci Rep 9, 8392 (2019): Cheong, et al. An inductively powered implantable blood flow sensor microsystem for vascular grafts IEEE Trans Biomed Eng 2012 September: 59 (9): 2466-75. doi: 10.1109/TBME.2012.2203131. Epub 2012 Jun. 6; and U.S. Pat. No. 10,869,748 "Active monitoring pressure-sensitive vascular graft".

"Ultra-low-power wireless implantable blood flow sensing microsystem for vascular graft applications" by Xue, et al.: 2011 International Symposium on Integrated Circuits IEEE Conference: 12-14 Dec. 2011, describes in response to the need for flow rate monitoring as an indication for early intervention of vascular graft degradation or failure in lower limb bypasses and renal haemodialysis, an inductively powered implantable blood flow sensing microsystem with bidirectional telemetry capability, which fully integrates the silicon nanowire (SiNW) sensor with tunable giant piezoresistivity, the ultra-low-power ASIC and the high-efficiency transcutaneous coupling coils. Operating at 13.56 MHz carrier frequency, the micro-fabricated coils transfer the power and command forward and backscatter the processed sensor readout information to an external device. The ASIC fabricated in 0.18 µm CMOS process occupies an active area of 1.5×1.78 mm 2 and consumes 21.6 µW totally. The SiNW diaphragm-based sensor provides the gauge factor higher than 300 with tuning voltage below 0.5 V. The proposed solution has demonstrated the 0.176 mmHg/√Hz sensing resolution with small device dimension and low power consumption. Vascular News Feb. 1, 2017 reports that remote monitoring of bypass flow using an implantable piezoelectric sensor, which can also be placed on stents, has shown successful and reliable transmission of signal over the first 30 days of an in vivo study. U.S. Pat. No. 8,784,475 by Izex Technologies which describes remote monitoring devices for use with vascular grafts.

The electroceutical patch and catheter components of the system are described in detail below.

A. Electroceutical Patch

As noted above, the electroceutical patch includes: (1) a biocompatible substrate: (2) an anode and a cathode, which are both on a same surface of the biodegradable substrate; and (3) an electrochemically initiated bioadhesive coating and in contact with both the anode and the cathode.

As explained in detail below, the electrochemically initiated bioadhesive of the electroceutical patch is electrocurable. The electrochemically initiated bioadhesive can be electrocured by applying a sufficient voltage or current to the electrochemically initiated bioadhesive, which renders it adhesive and capable of adhering to synthetic or natural materials, as noted above, which is or comes in contact with the activated electrochemically initiated adhesive. For the systems described herein, the catheter includes retractable anode and cathode wires (in contact with the anode and cathode of the electroceutical patch) which are able to deliver the necessary voltage or current to induce electrocuring of the electrochemically initiated bioadhesive of the coating on-demand when the electroceutical patch is placed and contacted with a tissue defect, as described and exemplified below.

FIG. 3A shows an exemplary electroceutical patch (also referred to as ePATCH) 200 contains a biocompatible substrate 205, anode and cathode electrodes 210 on the biocompatible substrate 205, and a coating layer of an electrochemically initiated bioadhesive 220 disposed over both the electrodes.

1. Biocompatible Substrate of Electroceutical Patch

The electroceutical patch includes a biocompatible substrate. The biocompatible substrate is flexible and conformable. The biocompatible substrate can be biodegradable and/or bioerodable depending on the materials from which it is formed. For example, the biocompatible substrate can be formed of one or more polymers which can degrade or erode under physiologic conditions. In some instances, degradation could occur in as little as 15 minutes or over a period of up to 12 months. Electroceutical patches need only be adhered long enough for a blood clot to form in instances such as where they are used to treat an artervenous malformation/defect. In other examples, electroceutical patches need long term placement to allow for tissue remodeling, such as when treating an aortic aneurysm. The selection of suitable substrate materials with suitable degradation times is possible based on parameters including, but not limited to, pathology, the defect parameters, defect location, tissue type, and the intended application. In some instances, the biocompatible substrate is made of a material that will not degrade or erode as it is intended to permanently seal a tissue defect. In some instances, the biocompatible substrate can be made from or can include a thermoplastic elastomer, collagen, cellulose, silicone, mesh, textile, hydrogel, or an adhesion barrier such as SURGIWRAP® (a polylactide, such as 70:30 poly(L-lactide-co-D, L-lactide).

In some instances, the biocompatible substrate can be made of polymers such as, but not limited to, acrylates (including methacrylates), proteins such as gelatin and collagen, polyesters such as poly(lactic acid), poly(glycolic acid), and polymers of lactic acid and glycolic acid, polyalkenes, polyureas, nylons, poly(hydroxy acids), polyurethanes, polyanhydrides, polyorthoesters, poly(ester amides), polyamides, poly(ester ethers), polycarbonates, polyvinyl ethers, polyvinyl esters, polyvinyl halides, polysiloxanes, polyhydroxyalkanoates, poloxamers, polyphosphazenes, polymers formed from lactones, celluloses including alkyl celluloses, hydroxyalkyl celluloses, cellulose ethers, cellulose esters, nitro celluloses, hydroxypropylcellulose, and carboxymethylcellulose, polydioxanone, polypropylene fumarate, poly(butic acid), poly(valeric acid), polycaprolactone, ethylene vinyl acetate polymer, polyalkyl cyanoacrylate, poly(lactide-co-caprolactone), poly(ethylene-co-maleic anhydride), poly(ethylene maleic anhydride-co-L-dopamine), poly(ethylene maleic anhydride-co-phenylalanine), poly(ethylene maleic anhydride-co-tyrosine), poly(butadiene-co-maleic anhydride), poly(butadiene maleic anhydride-co-L-dopamine), poly(butadiene maleic anhydride-co-phenylalanine), poly(butadiene maleic anhydride-co-tyrosine), poly(fumaric-co-sebacic anhydride), and blends and copolymers thereof. The polymers and any blends thereof described can have any suitable weight average molecular weight and polydispersity suited to forming a flexible and conformable substrate. Methods of forming flexible and conformable substrates such as, for example, by casting polymeric solutions or melts into a mold are known in the art. Other methods for creating a biocompatible substrate are known.

Various suitable materials for use as biocompatible substrate can also be made from a commercially purchased material, which can include thermoplastic elastomer, collagen, cellulose, silicone, mesh, textile, hydrogel, or an adhesion barrier such as SURGIWRAP® (a polylactide, such as 70:30 poly(L-lactide-co-D, L-lactide). Such materials can be used to prepare a desired biocompatible substrate.

The biocompatible substrate can have any suitable dimensions (i.e., length and width), thickness, and shape (i.e., square, circular, rectangular) which allows for the biocompatible substrate to cover a tissue defect, when the biocompatible substrate forms the base of the electroceutical patch. In some instances, the mechanical properties (i.e., elasticity, stiffness) of the biocompatible substrate are chosen to match or mimic the mechanical properties (i.e., elasticity, stiffness) of the tissue containing the defect which is being covered by the electroceutical patch.

In some instances, the shape and dimensions of the electroceutical patch are determined by the shape and dimensions of the biocompatible substrate. In some other instances, the shape and dimensions of the electroceutical patch are chosen based on the shape and dimensions of the tissue defect. In some instances, the biocompatible substrate is a planar substrate that has a square shape, as shown in FIG. 3. In some instances, the biocompatible substrate and consequently the electroceutical patch has a square shape with 1 sq. cm by 1 sq. cm dimensions. In some instances, the electroceutical patch of any shape can have a maximum dimension (i.e., length, width, or diameter) which range from about 3 mm to about 5 cm or any possible value or sub-range within. In some cases, the shape of the electroceutical patch may be circular or oval. The biocompatible substrate can have a thickness of between about 10 to about 500 microns, about 10 to 250 microns, 10 to 200 microns, 10 to 150 microns, or 10 to 100 microns. In some instances, the biocompatible substrate has a surface area of between about 5 $mm^2$ to 2500 $mm^2$ which can cover all or a majority of a tissue defect ("majority" denotes at least 80%, 85%, 90%, 95%, or 99% of the tissue defect) when it forms part of the electroceutical patch when adhered to the tissue defect.

2. Anode and Cathode Electrodes of Electroceutical Patch

Figure 3B:
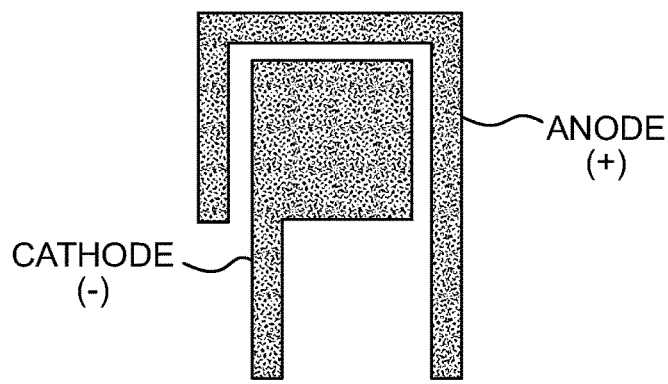
FIG. 3B is a non-limiting representation depicting the anode and cathode electrodes 210 of the electroceutical patch.

The electroceutical patches contains an anode and a cathode which is formed on or deposited on the same surface of a biocompatible substrate. FIG. 3B shows a non-limiting representation depicting an example geometry of anode and cathode electrodes 210 on the biocompatible substrate of an electroceutical patch.

Figure 3C:
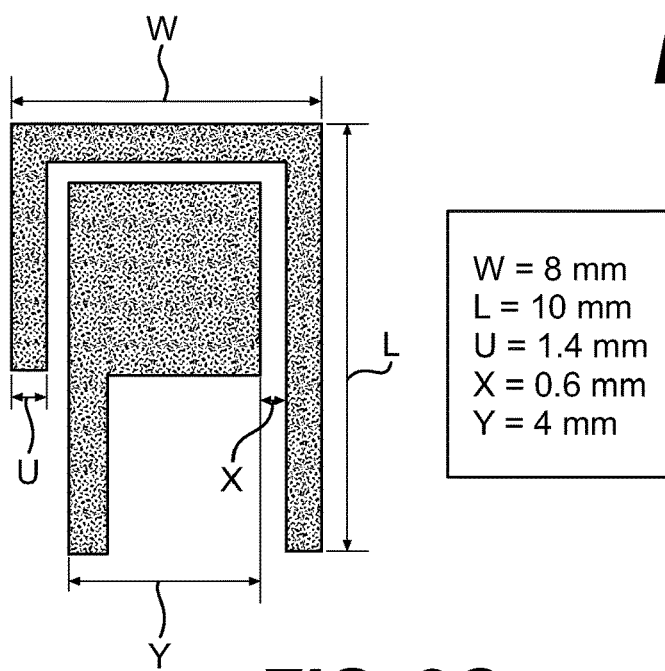
FIG. 3C is a non-limiting representation depicting exemplary sizes of the anode and cathode components of the electrodes 210.

The anode and cathode of the electroceutical patch can independently have any suitable shape, dimensions (i.e., length, width), surface area, as needed. However, it is appreciated that the aforementioned parameters are limited by the shape and dimensions of the biocompatible substrate on which the anode and cathode are formed on. In some instances, the cathode has a greater surface area than the surface area of the anode in order to promote the ability to electrocure the electrochemically-initiated bioadhesive. In some cases, the surface area of the cathode can be about 1.1, 1.2, 1.3, 1.4, 1.5, 1.6, 1.7, 1.8, 1.9 or 2 times greater than that of the anode. For example, FIG. 3C shows an exemplary representation of the shape and dimensions (denoted W, L, U, X, and Y) of anode and cathode electrode components 210 where the cathode has a greater surface area than the surface area of the anode.

In various instances, the electroceutical patch contain only one anode and one cathode. In some instances, the electroceutical patch can contain interdigitated anode and cathode electrodes. In some other instances, the electroceutical patch does not contain anode and cathode interdigitated electrodes.

The anode and the cathode can be formed of any suitable non-metallic conductive material which is biocompatible. Typically, the anode and the cathode are formed from the same material. In some instances, the anode and cathode are formed from a non-metallic conductive material, such as a composite ink containing graphene, carbon black, or carbon nanotubes. Such graphene composite inks are commercially known and are at least partially bioresorbable when formulated with a degrading polyester (such as, PLGA). In some other instances, the non-metallic conductive material can be made of or contain a conductive organic polymer, such as of PEDOT: PSS, polyacetylene, poly(3-alkyl-thiophene), polyaniline, polyisothianaphthalene, poly-(p-phenylene), poly-(p-phenylene vinylene), polypyrole, polythiophene, or combinations thereof. Other suitable non-metallic conductive materials are known and can be commercially purchased with the requirement that they be biocompatible. In some instances, the non-metallic conductive material is chosen to have an electrical conductivity of at least about 500, 600, 700, or 800 S/m.

Methods of forming or printing electrodes (anode and cathode) from such non-metallic conductive materials are known in the art. In some instances, the anode and cathode each having a desired geometry can be 3-D printed from a suitable non-metallic conductive material (such as a graphene composite ink) onto the biocompatible substrate. Other methods of forming an anode and cathode onto a biocompatible substrate are also known in the art.

The anode and cathode electrodes can independently have any suitable thickness ranging from between about 10 to 150 microns, 10 to 125 microns, or 50 to 100 microns. The thickness of the electrodes can be uniform or non-uniform.

3. Electrochemically-Initiated Bioadhesive on Electroceutical Patch

The electroceutical patch contains a coating or layer of an electrochemically initiated bioadhesive over the anode and cathode. The electrochemically initiated bioadhesive contains one or more biocompatible polymers comprising a plurality of electroactive groups which are electrocurable. The plurality of electroactive groups can be activated on-demand by applying a voltage or current above a threshold to the electrochemically initiated adhesive. As the voltage or current surpasses a threshold value, the electroactive groups contained in the electrochemically initiated adhesive are switched 'on' and able to crosslink the polymer backbones therein thereby rendering the electroceutical patch adhesive and capable of adhering to synthetic or natural materials, such as a tissues such as porcine myocardium, swine aorta, porcine carotid artery, swine epicardium, and rat's pericardium, thermoplastic elastomer, proteins such as collagen, polymers such poly-L-lactide, and polysaccharides such as cellulose, which is or comes in contact with the activated electrochemically initiated adhesive.

Figure 4:
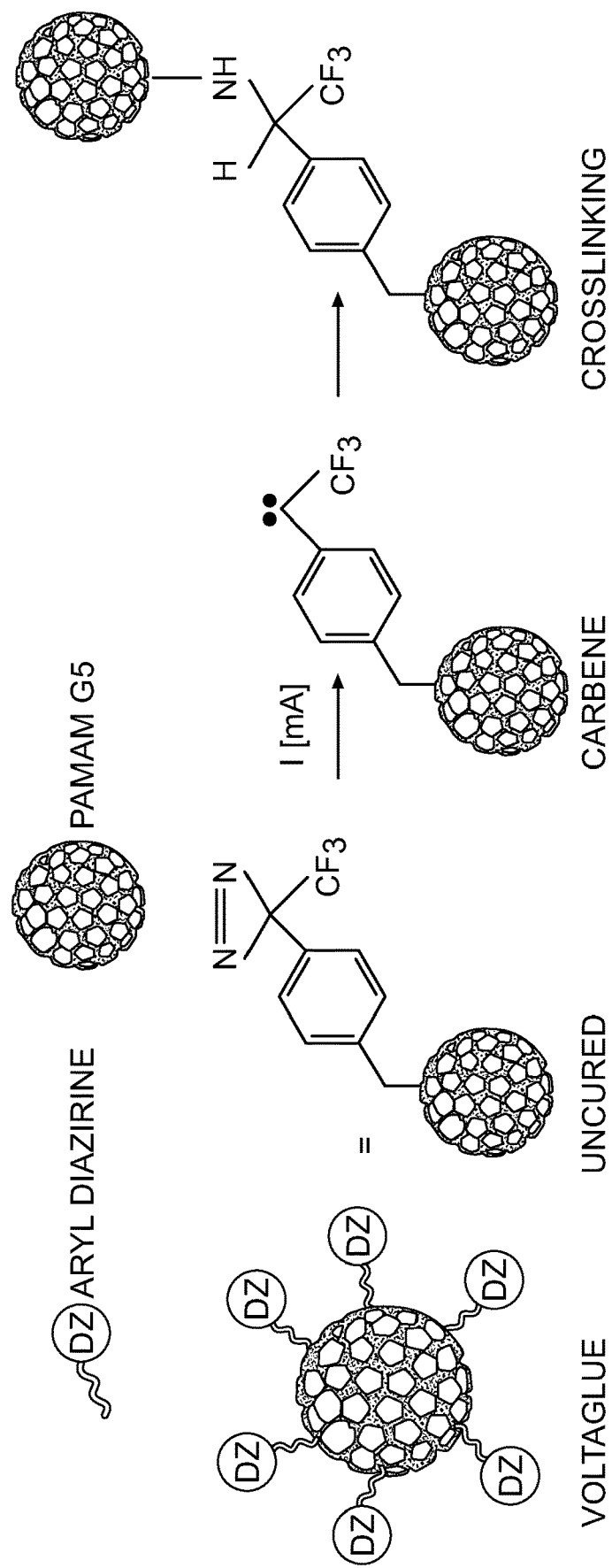
FIG. 4 shows a non-limiting representation of the chemical structure of the electrochemically initiated bioadhesive VOLTAGLUE before and after exposure to an electric current.

In some instances, the electrochemically initiated bioadhesive is made of or contains a PAMAM-g-diazirine, also referred to herein as VOLTAGLUE. Methods of synthesizing PAMAM-g-diazirine and viscous formulations thereof are exemplified herein and are known in the field (Singh, M., et al., Voltaglue Bioadhesives Energized with Interdigitated 3D Graphene Electrodes. Adv Healthc Mater 2018, 7 (21), e1800538: Singh, M., et al., Voltaglue electroceutical adhesive patches for localized voltage stimulation. ACS Applied Bio Materials 2019; Nanda, H. et al., Thrombogenic Responses from Electrocured Tissue Adhesives. ECS transactions 2017, 77 (11), 547-555: Ping, J. et al., Adhesive curing through low-voltage activation. Nat Commun 2015, 6, 8050; and Singh, M. et al., Synergistic Voltaglue Adhesive Mechanisms with Alternating Electric Fields. Chemistry of Materials 2020). The PAMAM-g-diazirine electrochemically initiated bioadhesive can be formulated as a viscous formulation by dissolving the PAMAM-g-diazirine in an aqueous solution, such as an aqueous buffer, for example, at a 50% w/w ratio. The viscous VOLTAGLUE formulation can be deposited over the anode and cathode present on the biocompatible substrate to form the final electroceutical patch. FIG. 4 depicts the formation of a carbene reactive species from a PAMAM-g-diazirine by electrical stimulation. Carbenes can non-selectively insert into X—H bonds (X=C, O, S, N), which gives VOLTAGLUE a unique capability to adhere to tissue surfaces, even when wet. Certain electrochemically initiated bioadhesives, such as PAMAM-g-diazirine foam during activation due to the production and release of nitrogen gas which can cause the electrochemically initiated bioadhesive to expand and aid in sealing the tissue defect by itself or when combined with the pressure applied by the inflated balloon of the catheter during use. In some instances, use in blood could pose a risk for embolism, so some situations may require steps to mitigate or control of the risks.

Other electrochemically initiated bioadhesives can also be used in the electroceutical patch. For example, U.S. Published Application No. 2016/0331861 A1, which is incorporated in relevant part herein, describes electrochemically initiated bioadhesives containing one or more biocompatible polymers which contain a plurality of electroactive groups which are derivatives of diazonium, arylsulfonium, and/or diaryliodonium groups. The biocompatible polymers can contain one or more strands of repeating-units and up to 5,000 electroactive groups covalently attached to each strand, wherein the electroactive polymer has a molecular weight of up to 3 million Daltons. Exemplary biocompatible polymers can be any bioresorbable polymer that has been FDA-approved as a medical device selected from the group consisting of polyethylene glycol (PEG), PEG fatty acid esters, poly-L-lactic acid (PLLA), poly(lactide-co-glycolide) (PLGA), poly caprolactone (PCL), polyvinyl pyrrolidone (PVP), polyvinyl alcohol (PVA), collagen, chitosan, hydroxy propyl cellulose, polyamides, polyglycerol esters of fatty acids, polysaccharides, polyesters, and combinations thereof. Polysaccharide can be dextran, chitosan, heparin, hyaluronic acid, alginates, starch, glycogen, amylose, amylopectin, cellulose, xylan, or other natural and synthetic polysaccharides. Exemplary electroactive diazonium, arylsulfonium, and diaryliodonium derivatives of various formulae, which can be present on the biocompatible polymers, are described throughout U.S. Published Application No. 2016/0331861 A1. Still other electrochemically-activated bioadhesives (e.g. catechol, and ferrocene-based) are known and can be used in the electroceutical patches, if non-foaming or non-aqueous formulations are desired (Ping, J., et al., Adhesive curing through low-voltage activation. Nat Commun 2015, 6, 8050; Gan, L., et al., Self curing and voltage activated catechol adhesives. Chem Commun (Camb) 2019; Gan, L., et al., Voltage-Activated Adhesion through Donor-Acceptor Dendrimers. Macromolecules 2018, 51 (17), 6661-6672).

The electrochemically initiated bioadhesive can be formed as a layer or coating onto the anode and cathode present on the biocompatible substrate. The layer or coating can have a thickness in a range of about 1 to 750 microns, 1 to 500 microns, or 1 to 250 microns. The layer or coating typically has a uniform thickness. In some instances, the layer or coating covers all of the surface onto which the layer or coating is deposited on but may cover less than the entirety of the surface. In some cases, the layer or coating covers at least 75%, 80%, 85%, 90%, 95%, or greater of the surface onto which the layer or coating is deposited and contacts both the anode and the cathode.

The electrochemically initiated bioadhesive used in the electroceutical patch may optionally contain additional components which do not interfere with its ability to adhere onto tissue when activated. These additional components may be present in any suitable concentration which does not interfere with its ability to adhere onto tissue when activated. Such components can include, without limitation, pharmaceutically acceptable suitable solvents, pharmaceutically acceptable surfactants, pharmaceutically acceptable stabilizers, pharmaceutically acceptable fillers, and other pharmaceutically acceptable additives. Exemplary additives may be therapeutic drugs including, but not limited to anti-inflammatory drugs, anti-proteases, antibiotics, promoters for cell growth, anti-thrombotic drugs, anti-adhesion agents (to prevent scar tissue formation), and/or anti-restenosis compounds.

B. Electroceutical Catheter

As noted above, the catheter of the system includes: (1) a main shaft optionally comprising a guidewire: (2) an anode shaft comprising a retractable (optionally shape-memory) metal anode wire end: (3) a cathode shaft comprising a retractable (optionally shape-memory) metal cathode wire end: (4) a balloon inflation port on the main shaft; and (5) an inflatable balloon on an end portion of the catheter.

As shown in FIG. 1A, the anode and cathode shafts can in some instances be bonded on diametrically opposite sides of the outside of the main shaft. Nevertheless, the placement of the anode and cathode shafts on the main shaft can be varied.

Figure 1B:
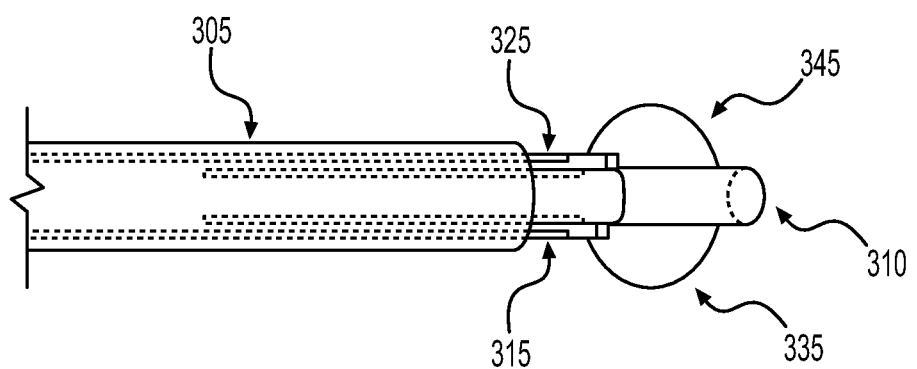
FIG. 1B is a non-limiting representation of system 300 for treating tissue defects containing functional components including: a coaxial shaft 305, guidewire route 310, balloon inflation port (not shown) on the coaxial shaft, retractable cathode wire 315, retractable anode wire 325, balloon 335, and electroceutical patch 345.
Figure 2A:
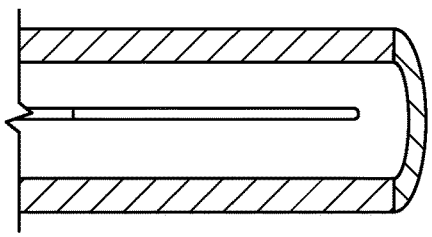
Figure 2B:
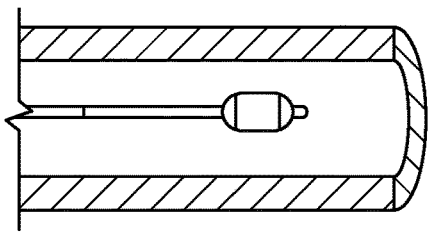
Figure 2C:
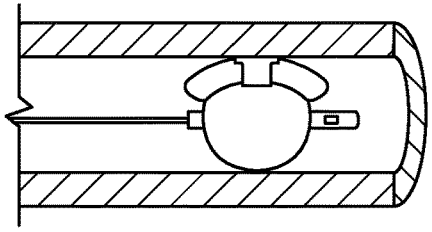
Figure 2D:
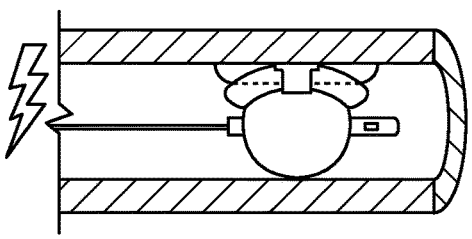
Figure 2E:
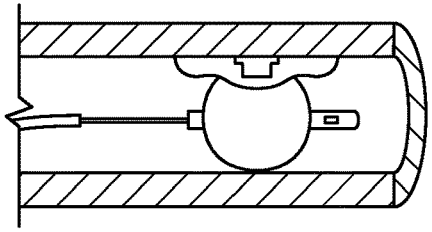
Figure 2F:
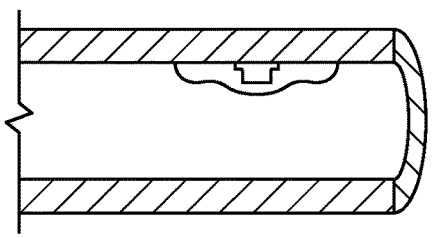

An alternate embodiment of the catheter replaces the anode and cathode shafts into a single coaxial shaft. In such an instance of the catheter, it includes: (1) a main coaxial shaft optionally comprising a guidewire containing a retractable (optionally shape-memory) metal anode wire and a retractable (optionally shape-memory) metal cathode wire: (2) a balloon inflation port on the coaxial shaft; and (3) an inflatable balloon on an end portion of the catheter. In such an instance of the catheter, the retractable shape-memory metal anode wires are insulated and separated from each other within the coaxial shaft. FIG. 1B shows a non-limiting representation of system 300 having a coaxial for treating tissue defects containing functional components including: a coaxial main shaft 305, guidewire route 310, balloon inflation port (not shown) on the coaxial shaft 305, retractable cathode wire 315, retractable anode wire 325, balloon 335, and electroceutical patch 345 on the balloon.

The catheter metal anode and cathode wires can each be contacted to an electrical source via the anode and cathode shafts (FIG. 1A) or the coaxial shaft (FIG. 1B). In other words, the wires can be connected to a suitable electrical source that provides a current to the (optionally shape-memory) metal anode and cathode wires. The electrical source does not form part of the system and is considered an external component to the system, such that the system in use can be connected to such a suitable source during use of the system. Various types of electrical sources are commercially known and can be used to controllably deliver the desired voltage or current through the (optionally shape-memory) metal anode and cathode wires to the anode and cathode of the electroceutical patch to activate the electrochemically initiated bioadhesive. For example, a Keithley 2450 Sourcemeter or AC to DC converter power supply can be used. It is also possible to use a custom built electrical source to apply the correct voltage, which could be integrated into the catheter portion of the system. The electrical source can deliver either alternating or direct current, preferably direct current, to the anode and cathode of the electroceutical patch via the retractable (optionally shape-memory) metal anode and cathode wires. In instances where direct current is used the current can range between about 0.5 to 3.5 mA or 1 to 3 mA. The length of time during which the current is delivered can be varied as needed to electrocure the electrochemically initiated bioadhesive and render it adhesive. In some instances, the current is applied for a time ranging from about 1 to 10 minutes, 1 to 5 minutes, or 30 seconds to 5 minutes. Reduction of the electrocuring time is also possible by employing (i) AC-based stimulation of electrochemically initiated bioadhesive, (ii) Li+ cation-based electrochemically initiated bioadhesive formulations, and (iii) and/or assisted electrocuring at high temperatures: as exemplified in Singh, et al., Synergistic Voltaglue Adhesive Mechanisms with Alternating Electric Fields, Chem. Mater. 2020, 32, 6, 2440-2449.

For the catheters described, the electroceutical patch is present on the inflatable balloon of the catheter when the balloon in not inflated. The (optionally shape-memory) metal anode and cathode wires are physically contacted/connected to the anode and cathode on the electroceutical patch, respectively. The (optionally shape-memory) metal anode and cathode wires can also be used to hold the electroceutical patch in an optionally coiled form around the inflatable balloon. In such instances, the (optionally shape-memory) metal anode and cathode wires are wrapped or coiled around the electroceutical patch and are deformed from their original straight form. For example, the wires can be threaded into pre-defined holes in the patch and the wire/patch assembly can be coiled or wrapped around the balloon intertwined with the patch to secure it in place. In instances where the anode and cathode wires are made of shape-memory metal or have shape-memory metal ends exposure to an electrical current causes electrical resistance heating in the shape-memory metal anode and cathode wires which causes the wires to straighten to their original straight shape which unwraps the wires and allows the electroceutical patch to uncoil and/or unwrap.

The main shaft, anode shaft, and cathode shaft can be made of any suitable biocompatible flexible plastic, such as polyurethane. The coaxial shaft, described above, can be made of the same material. Suitable shafts can be commercially purchased or fabricated (i.e., custom extruded from suitable materials) having a suitable diameter and length, as needed. In some instances, the main shaft or coaxial shaft has a diameter of between about 2-15 mm, 2-10 mm or 2-5 mm and the main shaft or coaxial shaft has a length of between about 10 cm to up to 1 meter, 10 cm to 150 cm, 10 cm to 100 cm, 15-50 cm or 15-25 cm. In some cases, the anode and the cathode shafts each independently have a diameter of between about 0.5-2 mm, 0.5-1.5 mm, 0.75-1.5 mm, or 0.75-1.25 mm and the anode and the cathode shafts each independently have a length which matches the length of the main shaft, such as between about 10 cm to up to 1 meter, 10 cm to 150 cm, 10 cm to 100 cm, 15-50 cm or 15-25 cm. In cases where a coaxial shaft is present in lieu of separate anode and cathode shafts, the coaxial shaft can have a diameter of between about 0.5-2 mm, 0.5-1.5 mm, 0.75-1.5 mm, or 0.75-1.25 mm and the coaxial shaft can have a length of between 10 cm to up to 1 meter, 10 cm to 150 cm, 10 cm to 100 cm, 15-50 cm or 15-25 cm.

For the retractable (optionally shape-memory) metal anode and cathode wires used in the catheter, these can have a length determined by the length of the anode and cathode shafts, or coaxial shaft. For instances where the retractable anode and cathode wires are made of shape-memory metal or contain ends made of shape-memory metal, these can be made of nitinol (nickel-titanium alloy). Other options for use as retractable shape-memory metal anode and cathode wires can be made of or contain a copper-zinc-aluminum alloy, copper-aluminum-nickel alloy, iron-manganese-silicon alloy. Alternatively, retractable shape-memory metal anode and cathode wires can be made of FLEXINOL® or MUSCLE WIRER.

In some instances, the retractable metal anode and cathode wires can be made entirely of shape-memory and traverse the entire length of the anode and cathode shafts, or coaxial shaft, and can be directly connected to an electrical source. In some other cases, it is also possible to connect each of the retractable shape-memory metal anode and cathode wires into their own separate flexible metal tubing, such as stainless steel tubing, present in each respective shaft. The flexible metal tubing is electrically conductive and spans the length of the anode and cathode shafts, or coaxial shaft. The metal tubing electrically can connect the retractable shape-memory metal anode and cathode wires to the electrical source. In such a case, a smaller length of retractable shape-memory metal anode and cathode wires is needed at the end portion of the catheter for purposes of connecting to the respective anode and cathode of the electroceutical patch and holding the patch on the balloon. As described, the retractable shape-memory metal anode and cathode wires are inserted into the metal tubing and plastic tubing, such as micro-renathane, urethane, nylon, or polyimide tubing, can be used to secure the retractable shape-memory metal anode and cathode wires joined into the flexible metal tubing.

The inflatable balloon of the catheter can be made of any suitable biocompatible material including compliant and non-compliant materials. Exemplary materials include, without limitation, thermoplastic polyurethanes and PET (polyethylene terephthalate), Such inflatable balloons for use in catheters are known and commercially available. The balloon can be controllably inflated/expanded to a diameter of about 5 to 50 mm via the balloon inflation port using a gas, such as air or inert gas, at a pressure of about 5 to 30 atm.

The catheter, which contains the electroceutical patch on the uninflated balloon (optionally housed within a sheath), can be maneuvered through large lumen vessels having an average diameter of between about 10-50 mm or through small lumen vessels having an average diameter of between about 2-10 mm. The catheter can also have a bending radius as small as about 10, 20, 25, 30, 35, or 40 mm, which allows it to navigate through complex (i.e., tortuous) organ or lumen structures to reach a tissue defect during use. The catheter can also contain radiopaque markers for visualization during use, such as during fluoroscopy.

C. Method of Preparing the Electroceutical Patch and Catheter System

The system described above can be made from various combinations of an electroceutical patch and catheter containing retractable electrode wires. In some instances, a method of making the system includes the steps of:
(1) providing an electroceutical patch as described above;
(2) providing a catheter as described above;
(3) contacting/connecting the retractable (optionally shape-memory) metal anode and cathode wires of the catheter to the respective anode and cathode of the electroceutical patch, where the electroceutical patch is held onto the inflatable balloon of the catheter by the wires: optionally, the electroceutical patch is coiled or wrapped around the balloon by the wires. For example, the wires can be threaded into pre-defined holes in the patch and the wire/patch assembly can be coiled or wrapped around the balloon intertwined with the patch to secure it in place. In some other instances, the patch may be loaded onto a sheath which holds it on the balloon, or it may be connected to the balloon via temporary sutures, or held on the balloon via a suitable adhesive or by vacuum onto the balloon.

D. Kits

The system can be provided in a kit where the electroceutical patch and catheter system are provided in the (sterile) kit for medical use. The kit includes at least the electroceutical patch and catheter system and may further include an electrical source. In some instances, the electrical source may be incorporated into the catheter, as described above.

In some instances, the (sterile) kit includes the electroceutical patch and catheter separately. In some instances, the (sterile) kit includes the electroceutical patch and catheter together, where the patch is pre-mounted on the uninflated balloon of the catheter. In still other instances, a (sterile) kit may include only the electroceutical patch or only the catheter, as described above. The electroceutical patch and catheter kits may be combined/matched, as needed. The (sterile) kits described may include other optional components such as instructions for use, instructions for assembly of the system from components in the kit, and an electrical source.

III. Methods of Treating Tissue Defects Using the Electroceutical Patch and Catheter System The electroceutical patch and catheter system can be used in the treatment of tissue defects in order to seal and/or repair the tissue defect. In some instances, a method of treating a tissue defect in a subject in need thereof using the system includes the steps of:
(1) inserting the electroceutical patch and the catheter of the system into the subject in need thereof having the tissue defect;
(2) delivering the electroceutical patch present on the inflatable balloon of the catheter to the tissue defect;
(3) inflating the inflatable balloon to press the electroceutical patch onto the tissue defect: where the electroceutical patch covers the tissue defect;
(4) activating the electrically initiated bioadhesive on the electroceutical patch in order to adhere the electroceutical patch onto the tissue defect;
wherein activating includes delivering an electrical current to the anode and the cathode of the electroceutical patch via the retractable (optionally shape-memory) metal anode and cathode wires from the electrical source;
wherein when the retractable metal anode and cathode wires are made of or contain shape-memory metal, the electrical current induces electrical resistance heating of the retractable shape-memory metal anode and cathode wires and the wires are straightened and straightening occurs prior to or simultaneously with electro-curing of the electrically initiated bioadhesive;
(5) retracting the straightened retractable (optionally shape-memory) metal anode and cathode wires from the electroceutical patch adhered to the tissue defect;
wherein retracting causes the retractable (optionally shape-memory) metal anode and cathode wires to separate and disconnect from the electroceutical patch thereby freeing the electroceutical patch which remains adhered/attached to the tissue defect and can remain thereon;
(6) deflating the inflatable balloon; and
(7) withdrawing the catheter part of the system from the subject.

For the methods described, a further step of visualizing and/or monitoring the treatment of the tissue defect is possible. In some instances, the catheter containing the electroceutical patch thereon is delivered to the tissue defect by a guidewire. In some other instances, the catheter containing the electroceutical patch thereon is delivered using endoscopic guidance such as endoscope cameras, where guidewires are not preferred, e.g. in gastrointestinal tracts. In still other instances, visualization and/or monitoring of the system in use can be achieved with 2D or 3D ultrasound, or visualized under fluoroscopy or x-ray. In the latter case the balloon can be inflated with contrast, and markers can be added to the catheter.

Prior to electocuring of the electrochemically activated bioadhesive during step (4), the bioadhesive can have a loss modulus (G") higher than its storage modulus (G'). Exposure to an electric current during step (4) can induce, for example, crosslinking which can increase the storage modulus and transforms electrochemically activated bioadhesive into a viscoelastic material. Typically, the electrochemically activated bioadhesive exhibits gelation (the timepoint when G'=G") which inversely correlated with electric current applied. For electrocured electrochemically activated bioadhesives following step (4) the storage modulus (G') can range from 0.1 kPa to 3 kPa. In some cases, the electrochemically activated bioadhesive when cured during step (4) exhibits a gelation time between about 10 to 60 seconds or a gelation time between about 20, 30, or 50 seconds. For example, rapid gelation can be achieved within 20 seconds when a current of 3 mA is applied. In some instances, the method may further include a step of monitoring the current/ resistance feedback in order to determine the progression and/or completion of the electrocuring of the electrochemically activated bioadhesive during step (4).

The step of activating involves delivering an electrical current to the anode and the cathode of the electroceutical patch via the retractable (optionally shape-memory) metal anode and cathode wires from the electrical source. The electrical current can be an alternating (AC) or direct (DC) current, preferably a DC current ranging from about 0.5 to 3.5 mA or 1 to 3 mA is applied for at least about 1 to 10 minutes, 1 to 5 minutes, or 30 seconds to 5 minutes. In instances, where a DC current is used the current ranges from between about 1 to 3 mA and is applied for 1 to 5 minutes or 30 seconds to 5 minutes. For the methods described, the methods need not include steps involving photo-activation of any adhesives used.

The inflatable balloon of the catheter can be made of any suitable biocompatible material and is deflated prior to step (3) and is inflated during step (3) when it is controllably inflated/expanded to a diameter of about 5-50 mm via the balloon inflation port using a gas, such as air or other gas (such as, nitrogen, carbon dioxide), at a pressure of about 5 to 30 atm. The extent of inflation and the diameter of inflation will vary depending on the conditions needed to treat a tissue defect, such as location, lumen size, etc. The extent of inflation and the diameter of inflation of the balloon is also used to apply pressure to the electroceutcal patch which presses it against and holds it on the tissue defect while the electrochemically initiated bioadhesive is activated during step (4). During step (6), the balloon is deflated to allow it to be removed during step (7).

The activating step can occur under air or liquid medium and the electroceutical patch becomes electrocured and adhered to the tissue defect under either dry or wet conditions. In some instances, the electroceutical patch is activated and electrocured in a liquid medium (i.e., blood) which has a pulsatile pressure ranging from about 0 to 150 mm Hg and the electroceutical patch becomes adhered to the tissue defect during the activating step. The electroceutical patch, when adhered to a tissue defect, can withstand systemic pulsatile pressures for at least 5 hours (equivalent to over 20,000 loading cycles) at up to 150 mmHg. Prior to electrocuring, the electrochemically activated bioadhesive exhibits minimal surface washout even when exposed to a liquid medium even if it has a pulsatile pressure due to the high shea viscosity of the electrochemically activated bioadhesive.

The method can be used to treat various types of tissue defects, such as in lumen defects, where the lumen defect can have a size of between about 1-20 mm and any possible size or sub-range within. Following delivery of the electroceutical patch to a tissue defect and activation, the electroceutical patch is adhered to the tissue defect and completely closes or at least reduces the size of the tissue defect by at least 75-99.9%, as compared to the size of tissue defect before treatment. Exemplary tissue or lumen defects include, but are not limited to, an endoluminal defect, a blood vessel defect (i.e., artery or vein defect), an ear canal defect, an aorta defect (i.e., an aortic aneurysm), a gastrointestinal defect, a broncheal defect, a lymph tissue defect (i.e., lymph node defect), an esophogeal defect, a tracheal defect, a fistula, a colonoscopic perforation, an esophageal defect, an enterotomy, or an ureterovaginal malformation.

The electroceutical patch and catheter system when inserted into a body can traverse a lumen containing a defect where the lumen has an average diameter of about 10-50 mm or the lumen containing the defect has an average diameter of about 2-10 mm. In the methods using a catheter which contains the electroceutical patch on the uninflated balloon, the catheter can be maneuvered through large lumen vessels having an average diameter of between about 10-50 mm or through small lumen vessels having an average diameter of between about 2-10 mm. The catheter can also have a bending radius as small as about 10, 20, 25, 30, 35, or 40 mm, which allows it to navigate through complex (i.e., tortuous) organ or lumen structures to reach a tissue defect during use.

In some cases, it is advantageous to select materials (i.e., biocompatible substrate material) from which the electroceutical patch is formed such that when adhered to the tissue defect, the electroceutical patch has elastic and/or other mechanical properties, such as stiffness, which are the same or substantially the same as the tissue containing the defect.

The electroceutical patch, once adhered to the tissue defect, can exhibit a shear adhesion strength from between about 3 to 60 kPa or greater, which is at least 100 times higher than arterial and venous wall shear stresses. In some instances, the shear adhesion strength of the electroceutical patch is up to 2×, 3×, or 4× stronger, as compared to commercial DURASEALR, due to the use of the electrochemically activated bioadhesive (such as VOLTAGLUE). The high adhesion properties observed in the electroceutical patches allows them to adhere to wet substrates, including tissues, and remain water-tight, flexible, and remain intact for at least about 20,000 physiologically relevant dynamic stress/strain cycles and up to at least about 120 million cycles, or longer.

The electroceutical patch, once adhered to the tissue defect, can exhibit a burst pressure against ranging from a maximum value of about 150 down to 90 mm Hg respectively, which is in the range of physiological systolic arterial pressure in humans (~60 to ~150 mmHg). In some instances, the electrochemically activated bioadhesive when electrocured and adhered onto the tissue defect can provided at least 1.5×, 2×, or 3× times higher burst pressure than a commercially available sealant, such as DURASEAL®, used against the same type of tissue defect.

The electroceutical patch, once adhered to the tissue defect, can exhibit a tack adhesion strength ranging from about 5 to 50 kPa or 5 to 25 kPa. In some instances, the tack adhesion strength is about 80-90% stronger than commercially available DURASEAL® sealant when used to close a similar tissue defect.

The present invention will be further understood by reference to the following non-limiting example.

EXAMPLES

Example 1: Synthesis, Application and Testing of Patch

Experimental Fabrication Details:
Synthesis of the Voltage-Activated Bioadhesives (i.e. VOLTAGLUE Aka PAMAM-g-Diazirine):

Generation 5 polyamidoamine (PAMAM-G5) dendrimer was purchased from Dendritech, Inc, USA. 3-[4-(bromomethyl)phenyl]-3-(trifluoromethyl)-diazirine, referred to as aryl-diazirine throughout the text, was acquired from TCI, Japan. PAMAM-g-diazirine was synthesized with a 20% grafting ratio of aryl-diazirine onto the 128 surface amine groups of PAMAM-G5, as previously detailed (Singh, M., et al., Voltaglue Bioadhesives Energized with Interdigitated 3D Graphene Electrodes. Adv Healthc Mater 2018, 7 (21), e1800538: Singh, M., et al., Voltaglue electroceutical adhesive patches for localized voltage stimulation. ACS Applied Bio Materials 2019; Nanda, H. et al., Thrombogenic Responses from Electrocured Tissue Adhesives. ECS transactions 2017, 77 (11), 547-555: Ping, J. et al., Adhesive curing through low-voltage activation. Nat Commun 2015, 6, 8050; and Singh, M. et al., Synergistic Voltaglue Adhesive Mechanisms with Alternating Electric Fields. Chemistry of Materials 2020). The synthesized PAMAM-g-diazirine (20%) was dissolved in phosphate buffer saline (1X PBS) as 50% w/w ratio, and the resulting viscous formulation is referred to as "VOLTAGLUE" throughout the instant example section.

Fabrication of Dual Electrode Patch (ePATCH):

3D-Graphene ink was purchased from Dimension Inx, LLC, USA. Graphene electrodes were printed using a Cellink BioX printer on a variety of bioresorbable and biocompatible substrates, for example, collagen, cellulose, thermoplastic elastomer (TPE), Medtronic silicone, or SurgiWrap® (70:30 Poly(L-lactide-co-D, L-lactide). Printing parameters were as follows-nozzle size: 27 gauge, writing speed: 10 mm/s, pressure: 150 kPa, infill: 100%, perimeter: 0.01 mm. An exemplary design and geometry of the printed graphene electrodes are shown in FIGS. 3A-3C. A thin layer (~500 µm) of VOLTAGLUE bioadhesive (~30 mg) was spread over the electrode patch using a laboratory micro spatula, and the resulting assembly is referred to as an "ePATCH" throughout the instant example.

Fabrication of Catheter with Retractable Electrodes (CATRE):

A balloon (Olympus, MAJ-1351) for an ultrasonic endoscope was bonded over the main shaft (polyurethane, 12 Fr, 4 mm diameter, length 22 cm, Cook Medical) of the catheter using a Loctite 422 adhesive. For the anode and the cathode shafts, a wedge pressure catheter (4 Fr, 1.3 mm diameter, Teleflex Medical Ltd.) was trimmed from both proximal and distal sides so that 20 cm of the middle tube remained. The middle tubes, obtained from trimming two wedge pressure catheters, were bonded on two diametrically opposite sides of the main shaft using a Loctite 422 adhesive. Flexible stainless steel tubing (0.02-inch outer diameter, 0.005-inch wall thickness, 0.01-inch inner diameter), purchased from McMaster-Carr, was housed in the cathode and anode shafts to transfer the voltage from the distal to the proximal end of the catheter. Shape-Memory Nitinol wires (0.01-inch diameter) were fixed in the proximal side of the stainless steel tubing. The nitinol wires, and the joint of nitinol wire and stainless steel tubing were secured in a Micro-Renathane tubing (polyurethane, 0.025-inch diameter, Braintree Scientific). The cathode and the anode nitinol wires were perforated into the patch at the respective electrode portions thereon. The ePATCH was coiled around the balloon with the help of nitinol wires. The wires are threaded into pre-defined holes in the patch and the wire/patch assembly can be coiled around the balloon intertwined with the patch to secure it in place. A miniaturized catheter was also fabricated as described above, except the main shaft was created using a balloon wedge pressure catheter (6 Fr, 2 mm diameter, Teleflex Medical Ltd.) trimmed to a length of 22 cm.

Characterization Studies:
Characterization of Real-Time Rheology:

Viscoelastic mechanical properties were measured with a parallel plate rheometer setup (TA 65 Instruments, AR 2000). The ePATCH was affixed on the bottom Peltier plate of the rheometer with double-sided tape. The VOLTAGLUE was activated via the CATRE by supplying a direct current of 1-3 mA from a Keithley 2450 Sourcemeter. All experiments were performed in real-time at room temperature at 1% strain and 1 Hz oscillation with a 25 mm parallel plate probe (stainless steel), maintained at a gap of 0.30 mm.

Electric Current/Field Simulation Through Nearby Tissues:

For electric field finite element model simulations, a 3D model was built using the software COMSOL Multiphysics, V5.1, USA (not shown). For simplicity, all the layers were modeled as homogenous, isotropic conductors with constant conductivity and relative permittivity throughout. Graphene electrodes were assigned a conductivity of 875 S m$^{-1}$ and a relative permittivity of 500. The biocompatible substrate was assigned a conductivity of 106 S m$^{-1}$ and relative permittivity of 2. An electric current of 2 mA was established between the cathode and the anode. AC/DC module with the electric current interface was used to simulate the electric potential and electric field lines.

For electric current feedback, a stainless steel needle was inserted in the porcine heart tissue slice (20 mm×20 mm×2 mm) at a depth of 1 mm. Keithley 2450 Sourcemeter was used as an ammeter to record stray electric current across the needle. Next, the ePATCH was placed on the top of the porcine heart tissue and VOLTAGLUE was electrocured using 2 mA with a different current source. Simultaneously, the electric current was recorded across the needle in real-time by the ammeter.

Characterization of Morphology of Tissue/Bioadhesive Interface:

The cross-section of the tissue/bioadhesive interface was imaged by scanning electron microscopy (SEM). Electrocured bioadhesive samples on tissue substrates were freeze-dried for 12 hours and imaging was performed using Zeiss Merlin high-resolution SEM at an acceleration voltage of 1 kV and a working distance of 5 to 6 mm.

Characterization of Adhesion of ePATCH Against Biological Tissues:

Lap Shear: The maximum lap shear at failure was measured according to a modified American Society for Testing and Materials (ASTM) F2255-05 protocol. Biological tissue sections (2×2 sq. cm) and ePATCH were bonded on microscopic glass slides using Loctite 422 and tissue mounting double-sided tape (McMaster-Carr), respectively. VOLTAGLUE was cured for 5 minutes via the CATRE with a direct current of 1-3 mA from a Keithley 2450 Sourcemeter. DURASEAL® was used as a comparative control. DURASEAL® is a commercially available sealant that consists of two-part, in which polyethylene glycol (PEG)-activated ester crosslinks with trilysine upon mixing, that is technically improbable to utilize within catheters. For DURASEAL® (Covidien) testing, a 300 µm thick layer of sealant was sandwiched between the biocompatible patch and biological tissue sections and cured for 5 minutes. Lap-shear strength was quantified using a mechanical tensile tester fixed with a 2 kN force cell (Instron 5944), with a linear extension of 3 mm min−1. Force measurement accuracy of the 2 kN load cell is +0.5% of reading. The fresh biological tissues including porcine heart and porcine aorta were purchased from Sierra For Medical Science, Inc., California.

Burst Pressure: Maximum hydrostatic pressure at failure was performed according to a modified ASTM F2392-04 protocol. Biological tissue specimens were cut to a dimension of 2×2 sq. cm, and a 2 mm defect was created at the center using a 13-gauge needle. A syringe pump was attached to a pressure sensor (TruWave, Edwards Lifesciences) and a 1.5 mL hollow chamber using a T-connector. The upper piece of the hollow chamber contained a 10 mm diameter opening in its center and the tissue substrates were fixed on it. ePATCH was placed over the defect and activated via the CATRE with a direct current of 1-3 mA from a Keithley 2450 Sourcemeter. For DURASEAL® (Covidien) testing, a 300 µm thick layer of sealant was sandwiched between the biocompatible patch and biological tissue substrates and cured for 5 minutes. Air (10 mL min$^{-1}$) was supplied into the assembly and burst pressure was recorded via the pressure sensor.

Tack Adhesion: Biological tissue sections (2×2 sq. cm) and ePATCH were bonded on microscopic glass slides using Loctite 422 and tissue mounting double-sided tape (McMaster-Carr), respectively. VOLTAGLUE bioadhesives were cured for 5 minutes via the CATRE with a direct current of 1-3 mA from a Keithley 2450 Sourcemeter. For DURASEAL® (Covidien) testing, a 300 µm thick layer of sealant was sandwiched between the biocompatible patch and biological tissue sections and cured for 5 minutes. The pull-off/tack strength was measured using a 5944 Instron mechanical tester at an elongation rate of 3 mm min$^{-1}$. ePATCH detachment from the biological tissue surface was quantified as the maximum load before failure. For porcine heart samples, a test-rig was custom-designed to fix the heart to the lower clamp of the mechanical tester, as described earlier (Horvath, M. A. et al., Towards Alternative Approaches for Coupling of a Soft Robotic Sleeve to the Heart. Ann Biomed Eng 2018, 46 (10), 1534-1547). Each specimen was attached to the heart and pulled-off with the moving upper clamp.

Evaluation Studies:

Fistula Models:

The ex-vivo biological fistula model was created in the laboratory by adjoining a renal and a carotid artery using Sil-Poxy (Smooth-On) adhesives. Porcine carotid and renal arteries were purchased from Sierra For Medical Science, Inc., California. A defect of 2 mm was created in the renal artery before its bonding with the carotid artery.

The vascular graft-based fistula model was created by adjoining two vascular grafts of diameter 20 and 10 mm using Sil-Poxy (Smooth-On) adhesives. A defect of 2 mm was created in the bigger graft before its bonding with the smaller graft. The vascular grafts, purchased from Hemashield Gold, are made of knitted polyester and bovine collagen. The entire fistula model was coated with a soft silicone elastomer (Ecoflex 00-20, Smooth-On) to prevent any air leakage. The arteriovenous (AV) fistula defects were closed with the electroceutical patch and CATRE system with a direct current of 3 mA from a Keithley 2450 Sourcemeter and subsequently evaluated for tissue sealing.

Closure of Ex-Vivo Carotid Artery Defects:

A 2 mm defect was created in fresh porcine carotid arteries (Sierra For Medical Science, Inc., California). Porcine defects were sealed with the electroceutical patch (ePATCH) and CATRE system with a direct current of 3 mA from a Keithley 2450 Sourcemeter. Masson's trichrome (MT) staining was performed to evaluate the interaction of ePATCH with biological tissues at the interface. The carotid arteries were fixed with 10% formalin (Carolina Biological Supply). Closure of carotid artery defects in presence of heparin-infused blood was illustrated with hematoxylin and eosin (H&E) stained cross-sections of ~10 µm thickness.

Demonstration of Defect Sealing Under Continuous/Pulsatile Flow:

Ex-vivo swine aorta with a 3 mm defect was connected in a mechanical cardiac circuit on a superior vena cava port. Sodium citrate-infused porcine blood (purchased from Sierra For Medical Science, Inc., California) was circulated at a rate of 10 mL min$^{-1}$ through the assembly using a syringe pump. ePATCH was delivered via the CATRE catheter, where the catheter was inserted from the inferior vena cava port and moved to the aorta. ePATCH was electrocured for 5 minutes via the CATRE with a direct current of 3 mA from a Keithley 2450 Sourcemeter.

The ability of the ePATCH to withstand the pulsatile flow like physiological conditions was evaluated against collagen tubes (Nippi, Japan) of diameter 3 cm. A synthetic blood fluid (1.2-ethanediol (monoethylene glycol) with 20% glycerine additive: 25% diluted with water), that mimics blood viscosity (~3 cP) was circulated under pulsatile flow (60-125 mm Hg, Harvard Apparatus, USA) at a mean flow rate of 2 L min$^{-1}$. Three defects, each 2 mm in diameter, were created and subsequently sealed via the electroceutical patch and CATRE system with a direct current of 3 mA from a Keithley 2450 Sourcemeter.

Evaluation of the Thrombogenic Potential:

Square patches (1×1 sq. cm) of a biocompatible substrate, graphene electrodes, DURASEAL®), uncured, electrocured, and UV-cured VOLTAGLUE were incubated with heparin-infused porcine blood (Sierra For Medical Science, Inc., California) for 1 h at 37° C. on a hematology mixer. The uncured, electrocured, and UV-cured VOLTAGLUE samples were washed with heparin (5% w/v in 1×PBS) before incubation. The surfaces after the blood contact were rinsed three times with 50 mL PBS and immersed in 1 mL of 2% Triton X-100 solution for 20 minutes to lyse surface adherent platelets. The number of deposited platelets on each specimen was then quantified by a lactate dehydrogenase (LDH) assay with an LDH-Glo™ Cytotoxicity Assay Kit (Promega). The Luminometric readings were recorded using VarioskanFlash 4.00.53 (Thermo Fisher Scientific Inc), and SkanIt Software 2.4.5 RE for Varioskan Flash.

In Vivo ePATCH Activation:

In vivo electrocuring was performed on rat's heart in Sprague Dawley female rats. The ePATCH, as described above, was sterilized by soaking in 70% ethanol for 30 minutes before the procedure. All procedures were performed per Massachusetts Institute of Technology's Committee on Animal Care (protocol number: 0118-006-21). Sprague Dawley female rats (300-350 g) were anesthetized with isoflurane 2-3%, and the preemptive analgesic Slow Release of buprenorphine SR-Bup (1 mg/kg) was administered subcutaneously. Chest hairs were removed. Endotracheal intubation was performed, and the animals were connected to a mechanical ventilator (Model 683, Harvard Apparatus) and placed over a heating pad for the duration of the surgery. A thoracotomy was performed in the third or fourth left intercostal space. The heart was exposed, and the ePATCH was delivered on the heart. In vivo electrocuring was performed on the rat's heart via the modified miniaturized catheter by supplying a direct current of 3 mA for 5 minutes. Real-time electrocardiogram (ECG) was recorded during the electrocuring via a lead II configuration using the PowerLab from AD Instruments. After 30-60 minutes of the procedure, animals were euthanized by CO2 inhalation. The hearts were excised and fixed in 10% formalin for 24 hours for hematoxylin and eosin (H&E) stained histological analysis.

Statistical Analysis:

All data presented in the instant examples section are given as mean±SD (n=3, unless stated otherwise). The significance was evaluated with OriginPro 2019 64-bit software by one-way ANOVA with Tukey correction as a post hoc test. $p<0.05$ (*) was considered to be statistically significant. Ex-vivo proof-of-concept testing involved sample sizes from one to five. Sample size for in vivo electrocuring in small animals was two. Sample numbers are recognized as small due to constrained accessibility to animal testing, but the small numbers do not discredit or invalidate the results presented in the experiments described herein.

Results:

Scope and Study Design:

An electroceutical patch and catheter system, as described above, was designed to deliver voltage-curable adhesives and propagate electric voltage to adhere thin-film electroceutical patches onto lumen defects.

An electroceutical catheter, as described throughout and exemplified herein, consists of two sub-components: (1) the ePATCH, a dual-electrode patch coated with VOLTAGLUE; and (2) the CATRE, a minimally invasive catheter with retractable electrodes. The ePATCH was constructed by 3D printing graphene inks on electrically insulating, biocompatible, and impermeable polymer substrates (Jakus, A. E., et al., Three-Dimensional Printing of High-Content Graphene Scaffolds for Electronic and Biomedical Applications. ACS Nano 2015, 9 (4), 4636-4648). The CATRE was designed to navigate complex lumens, transport and deploy a coiled ePATCH via balloon inflation, and provide electrical leads that subsequently retract after VOLTAGLUE activation.

For minimally invasive surgical interventions in lumens that range from 10-30 mm, the CATRE was designed within an insertion size of 7 mm (20 French gauge), an elastomeric balloon with diameter expansion of 10-30 mm (5 to 20 atm), and a flexible shaft with radiopaque (x-ray) markers for navigation.

Structure-activity relationships of the electroceutical catheter, tested at three current levels (1, 2, and 3 mA), were evaluated against viscoelastic material properties via rheometer. Repair of lumen defects with the electroceutical catheter platform was modeled with defects and subsequent closures on porcine aorta, carotid artery, and heart tissues. In-vitro lap shear, burst pressure, and wound closure tests were benchmarked to a commercially-available tissue adhesive (DURASEAL®). The electroceutical catheter device functionality was tested in an ex-vivo fistula model. The electroceutical catheter was also tested in vivo to study any side-effects of endogenous electrical activity on the exogenous electric fields in a beating rat heart.

Design of CATRE for Transporting and Deploying the ePATCH:

The electroceutical catheter platform was designed with an aim to repair lumen defects, such as perforated blood vessels and fistulas. The CATRE was fabricated with commercially available catheter components and was designed within the specifications of percutaneous surgical intervention procedures. The CATRE is a 4-lumen catheter with channels for: (1) a guidewire, (2) balloon inflation, (3) an anode (+) lead, and (4) a cathode (−) lead. FIG. 1A illustrates the major components of the 4-lumen catheter. The cathode and anode leads were engineered of shape-memory Nitinol wires, which are stitched into the ePATCH. The ePATCH was selected from known biomaterials that are elastic and flexible for conformal contact capable of accommodating curvilinear surfaces. The nitinol/ePATCH interface design encompasses catheter fastening, coiling around the deflated balloon, and a method of electrode detachment. ePATCH lumen delivery involves the following steps (see FIG. 2): (i) a lumen guidewire inserts the CATRE, (ii) the CATRE deploys the coiled ePATCH to the site of the lumen defect and the stitched Nitinol wires retain the ePATCH while traversing along the guidewire, (iii) balloon inflation temporarily joins the ePATCH over the lumen defect, (iv) the CATRE activates VOLTAGLUE by transferring electric current to ePATCH via the two Nitinol lead wires, and (v) electric resistance heating activates the Nitinol shape memory, and the wires subsequently straighten. In the final step, the straightened lead wires are retracted from the affixed ePATCH, balloon is deflated, and the CATRE is removed via the insertion guidewire.

Construction and Components of the ePATCH Platform:

PAMAM-g-diazirine, otherwise referred to as VOLTAGLUE, is a model system for voltage-activated adhesives, in which aryl-diazirine (an electrochemical cross-linker) is grafted onto the surface of a polyamidoamine (PAMAM) dendrimer (see FIG. 4). Voltage initiates crosslinking, where aryl-diazirine is hypothesized to covalently bond via carbene insertion (Singh, M., et al., Voltaglue Bioadhesives Energized with Interdigitated 3D Graphene Electrodes. Adv Healthc Mater 2018, 7 (21), e1800538: Singh, M., et al., Synergistic Voltaglue Adhesive Mechanisms with Alternating Electric Fields. Chemistry of Materials 2020). Carbenes non-selectively insert into X—H bonds (X=C, O, S, N), which gives Voltaglue a unique capability to adhere to wet tissue surfaces (Ping, J., et al., Adhesive curing through low-voltage activation. Nat Commun 2015, 6, 8050). Previous investigations have demonstrated that constant current provides more consistent crosslinking vs. constant voltage (Singh, M., et al., Voltaglue electroceutical adhesive patches for localized voltage stimulation. ACS Applied Bio Materials 2019: Singh, M., et al., Synergistic Voltaglue Adhesive Mechanisms with Alternating Electric Fields. Chemistry of Materials 2020, 32 (6), 2440-2449). Activation of VOLTAGLUE requires a flux of current through its matrix and curing occurs at the cathode. To activate the adhesive on non-conductive biomaterials, graphene ink was extrusion-printed on a variety of bioresorbable flexible substrates in a dual-electrode geometry that maximized the cathode surface area (see FIGS. 3A-3C). A thin layer (~500 μm) of VOLTAGLUE was spread over the electrode patch and the resulting assembly is referred to as an 'ePATCH' herein. Conductive graphene ink (800 S/m) provides dry adhesion on collagen, cellulose, thermoplastic elastomer (TPE), Medtronic silicone, or SurgiWrap® (70:30 poly(L-lactideco-D, L-lactide) sheets. The ePATCH allows current to pass through the VOLTAGLUE. Crosslinking chemistry before and after activation of the ePATCH with the CATRE involves carbene insertion into nearby surfaces (see FIG. 4)

Figure 5A:
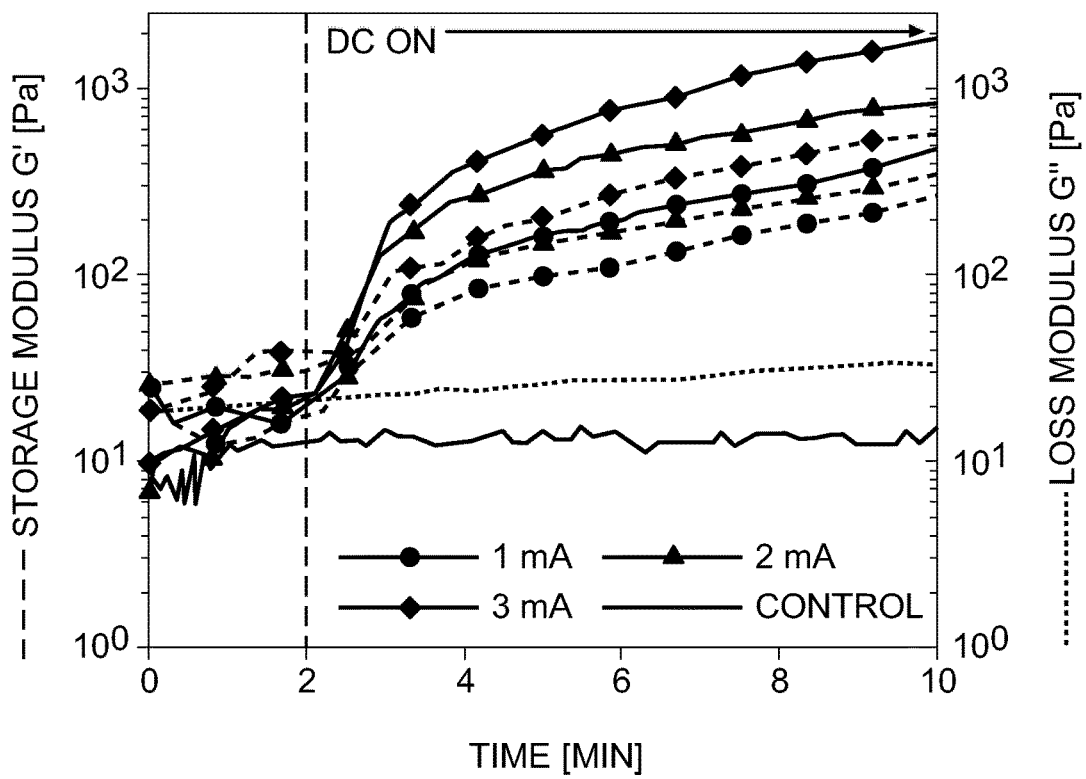
FIG. 5A shows a representative graph of the real-time storage (G'; Pa) and loss (G": Pa) modulus versus time for VOLTAGLUE before and after 1, 2, and 3 mA electric current stimulation.
Figure 5B:
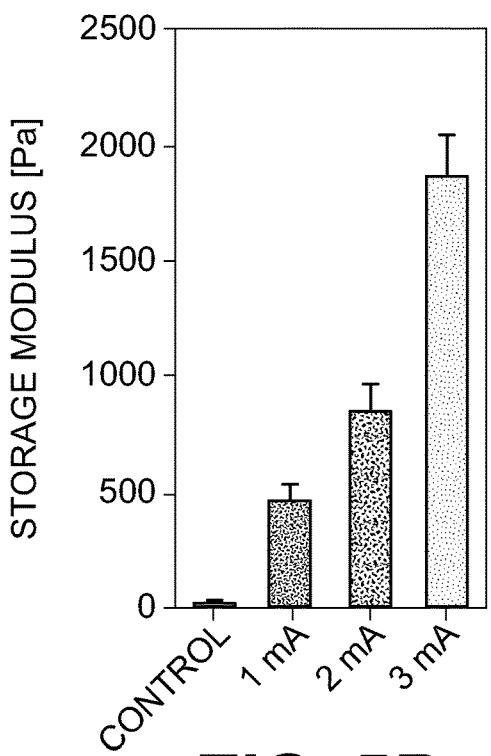
FIG. 5B shows a representative graph of the maximum storage modulus (G): Pa) after the termination of electric current following 8 minutes: where for Control, no current was applied.
Figure 5C:
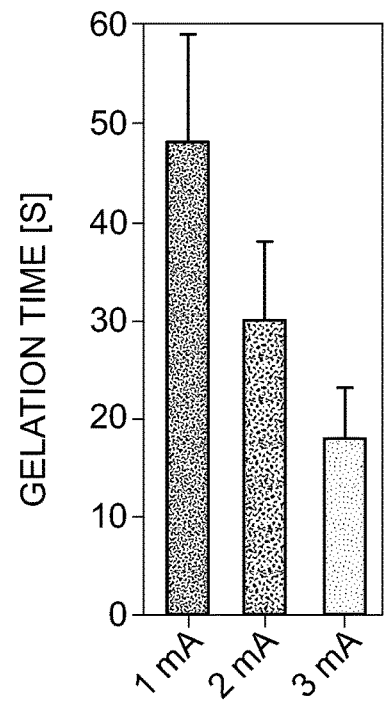
FIG. 5C shows a representative graph of the gelation time (G'=G") vs. electric current applied (1, 2, and 3 mA electric current stimulation).

Uncured VOLTAGLUE is a viscous aqueous polymer that can be easily spread over a surface. Real-time rheological investigations confirm the viscous behavior of the adhesive (see FIG. 5A). Before curing, loss modulus (G") is higher than storage modulus (G'). Exposure to electric current facilitates crosslinking which increases the storage modulus and transforms VOLTAGLUE into a viscoelastic film. Electric current of three different magnitudes (1, 2, and 3 mA), below the range of physiological let-go current (≤5 mA), were evaluated to maximize the storage modulus. Maximum voltage vs. time plots showed an increase in the maximum voltage with time, indicating that electrocuring increased the resistance of VOLTAGLUE. The ePATCH with no external electric current served as a 0 mA control and no gelation was observed within 8 minutes. Storage modulus (G') directly correlates whereas gelation time (the timepoint when G'=G") inversely correlates with electric current (see FIGS. 5B and 5C). Rapid gelation was achieved within 20 seconds for 3 mA curing conditions, but this required the highest voltage.

External Electric Current/Voltage does not Leak into Surrounding Tissues:

VOLTAGLUE can be activated with both direct current (DC) and alternating current (AC) (Singh, M., et al., VOLTAGLUE electroceutical adhesive patches for localized voltage stimulation. ACS Applied Bio Materials 2019: Singh, M., et al., Synergistic VOLTAGLUE Adhesive Mechanisms with Alternating Electric Fields. Chemistry of Materials 2020, 32 (6), 2440-2449). DC of 200 to 300 mA passes through the human body without harmful effects but only 30 mA of AC can cause an abnormal heart rhythm. Considering the characteristics of the electrical current and safety concerns, DC stimulation was chosen. The direct currents applied are relatively small (1-3 mA) but as a precautionary measure, the leakage of applied electric current from the electroceutical catheter into nearby soft tissues was investigated with COMSOL Multiphysics and the simulations were compared with experimental results. The z-plane multislice results of finite element modeling illustrated the surface distribution of electric voltage over the patch (not shown). The surface electric potential was at a maximum at the cathode and decayed gradually towards the anode. This simulation matched the experimental results where the activation initiated at the cathode and progressed towards the anode, as visually observed through nitrogen generation (not shown). The two-dimensional finite element modeling of the electric field demonstrated that the electric field lines penetrated only up to a depth of 1 mm in the nearby tissues upon stimulation by a current of 2 mA. The simulated ePATCH exhibited a surface electric potential of 3-4 V (not shown), whereas the experimental stimulation of ePATCH required a voltage range of 3-100 V. The mismatch was attributed to the varying resistance of the VOLTAGLUE from kΩ (uncured) to MΩ (cured) during electrocuring. The dynamic resistance was not taken into consideration during COMSOL simulation.

Figure 6:
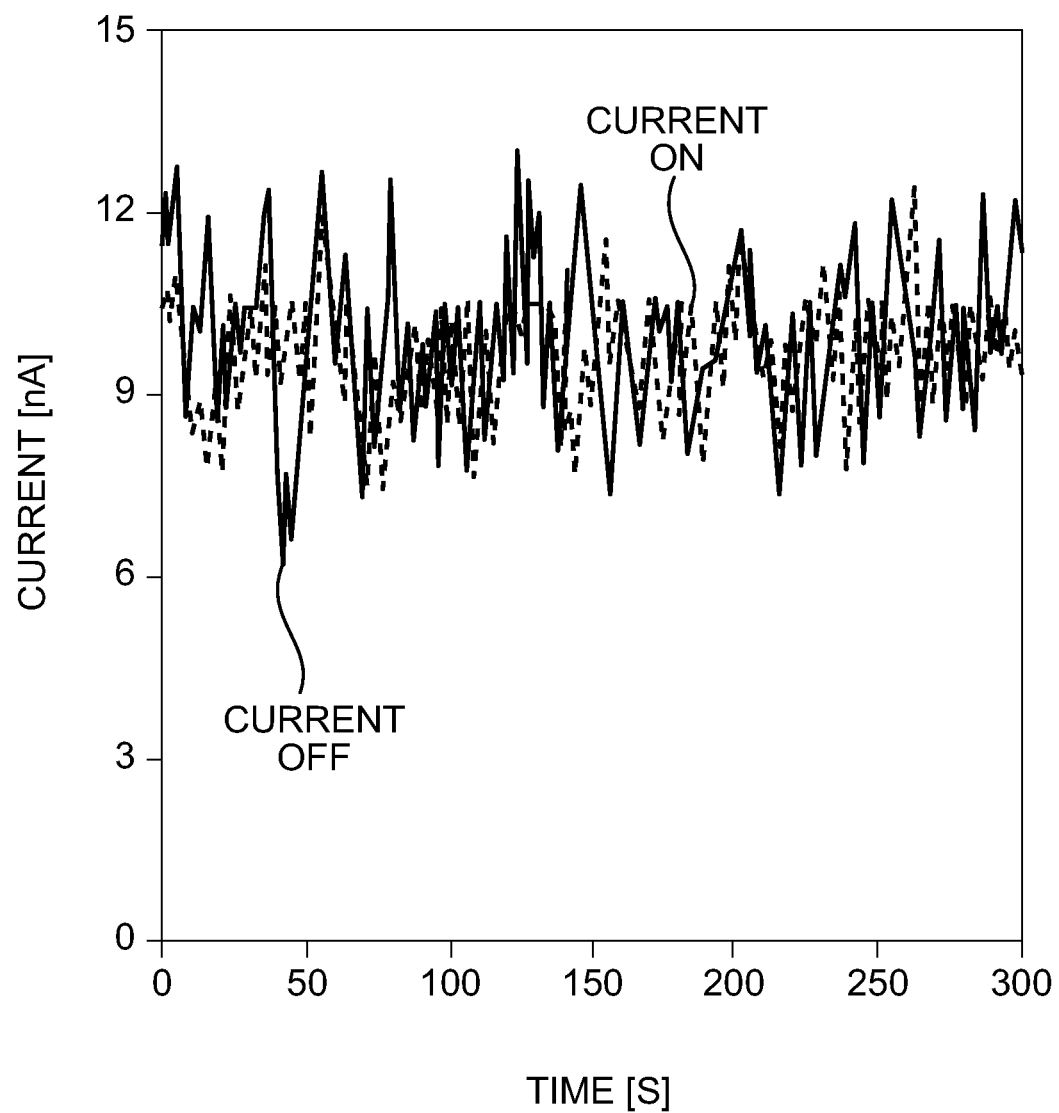
FIG. 6 shows a representative graph of the stray electric currents recorded by ammeter in porcine heart tissues with and without stimulation of the ePATCH in the vicinity.

The tissue/ePATCH assembly setup designed to test the extent of the electric field experimentally mimicked a 4-point probe technique that uses separate pairs of current-carrying and voltage-sensing terminals. A needle was inserted at a depth of 1 mm in a porcine heart slice of size 2×2×0.2 cm. The stray current was recorded across the needle, presented as a control ('current OFF'), as shown in FIG. 6. Next, ePATCH was placed on the surface of the pig myocardial tissue slice and the ePATCH was activated using 2 mA. Current was recorded simultaneously across the needle during the electrocuring, presented as 'current ON' in FIG. 6. The resistivity of porcine myocardial tissues is 200-300 ohm cm and that of VOLTAGLUE is 2000 ohm cm. If the current were to have leaked into the tissues, following the path of least resistance, the recorded 'current ON' would have increased. The recorded currents were 9.9±1.1 and 9.7±0.9 nA for 'current OFF' and 'current ON' conditions, respectively. No significant change in the recorded electric current supports that externally applied electric current does not leak into the underlying tissues within the parameters of the limited boundary conditions.

Repair of Lumen Defects in Soft Tissue Ex-Vivo and In-Vitro Models:

For visual identification of the electroceutical catheter process and to check if the ePATCH adhered to synthetic materials, a transparent polyvinyl chloride (PVC) pipe with a 2 mm defect was used to mimic a damaged lumen (not shown). Briefly, the operation occurred in the following steps: insertion of the catheter to the defect site, the balloon inflation to position the ePATCH over the lumen defect, activation of VOLTAGLUE via the Nitinol cathode (−) and anode (+), and retraction of the Nitinol shape memory wires upon successful closure of the defect. Additionally, an ePATCH was deployed and adhered inside a porcine aorta attached to whole excised porcine hearts in physiologically relevant assembly. Two endoscopic cameras were used to guide the catheter through the left ventricle to the aorta via the aortic valve. This required the CATRE to go through a bending diameter of 40 mm to navigate to the aortic defect site, indicating that the catheter could be easily manipulated through aorta. The ePATCH remained stitched and coiled around the balloon, even in absence of a protective sheath, demonstrating the flexibility and robustness of the CATRE/ePATCH system design through complex organ structures. CATRE navigation and ePATCH deployment through an ex-vivo heart met the tortuosity requirements for in vivo applications. Porcine aorta branching from an ex-vivo swine heart served as a model defect location, chosen because of its significance in diagnosing aortic valve regurgitation (e.g. aortic valve stenosis).

A vascular defect closure procedure was performed in an aorta connected at the superior vena cava port of a mechanical model of heart on a lab bench. The 2 mm defect size was created in the aorta as per ASTM F2392-04, which is a clinically relevant model for a standard test method for burst strength of surgical sealants. The CATRE was inserted from the inferior vena cava and navigated towards the defect site via the right atrium and ultimately secured ePATCH to the intraluminal wall of the defect. This strategic defect location was chosen because insertion of catheters at the inferior vena cava port is a typical endoscopic procedure for deep vein thrombosis, placement of filters, and diagnosing atrial septal defects (e.g. sinus venosus).

Figure 7A:
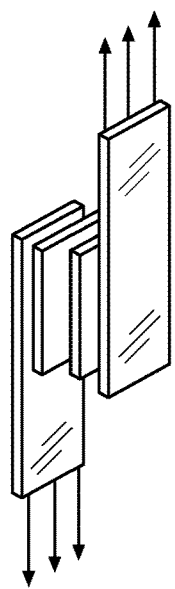
FIG. 7A shows a non-limiting schematic of a lap-shear test assembly.
Figure 7B:
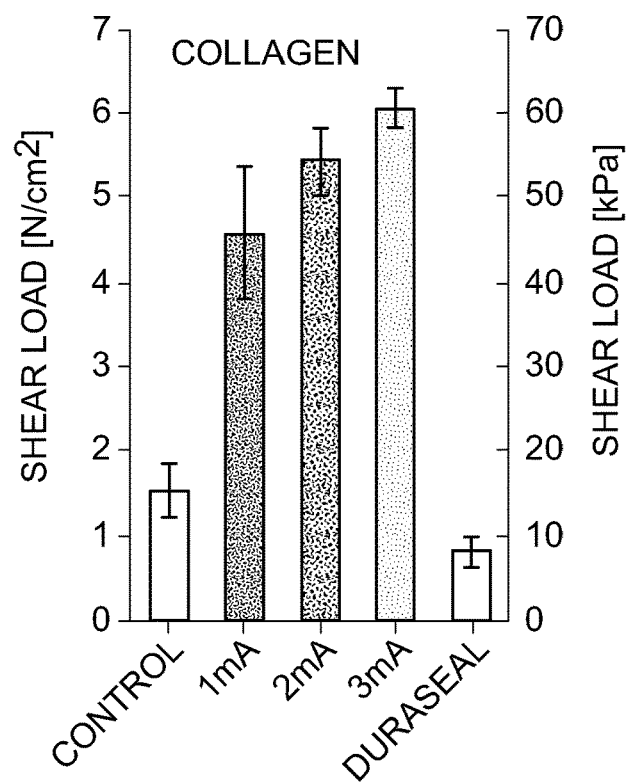
FIG. 7B shows a representative graph of the maximum shear adhesion strength at failure against collagen sheets.
Figure 7C:
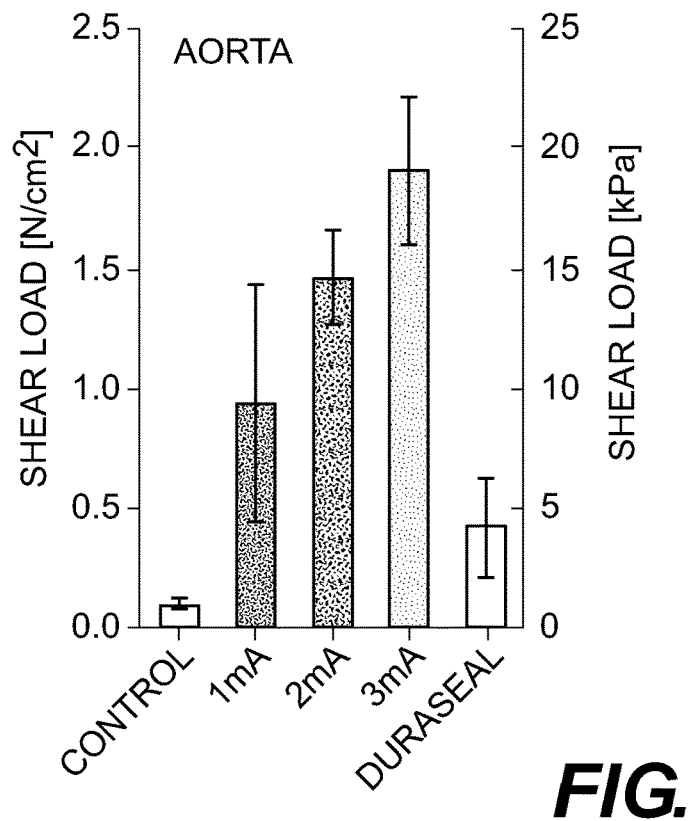
FIG. 7C shows a representative graph of the maximum shear adhesion strength at failure against porcine aorta.
Figure 7D:
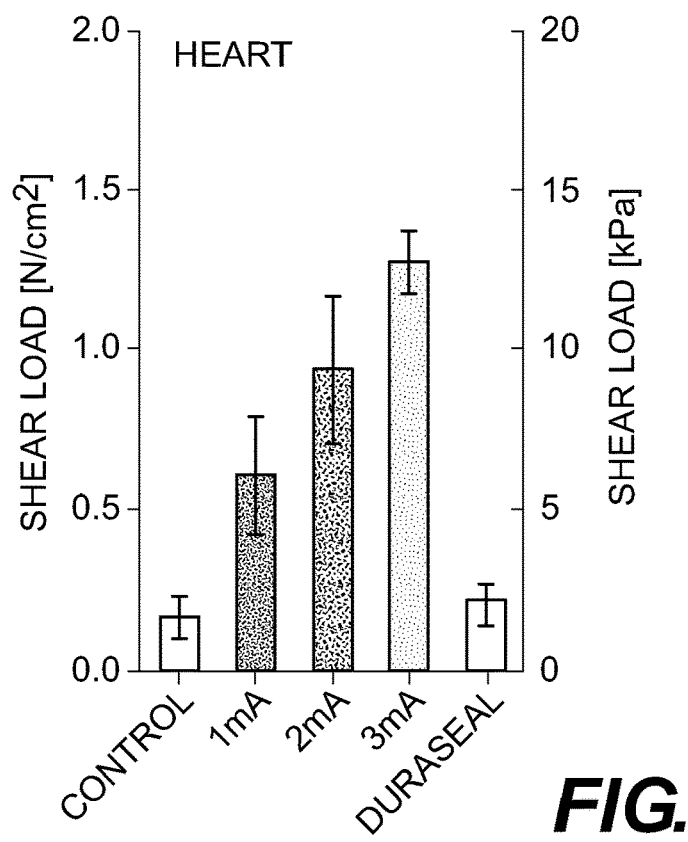
FIG. 7D shows a representative graph of the maximum shear adhesion strength at failure against porcine heart.

The adhered patch must withstand the hoop stresses exerted by the blood pulses inside the vessels. Normal physiologic levels of shear stress within arteries ranges from 0.001 to 0.007 kPa, whereas shear stress in veins ranges between 0.0001 to 0.0006 kPa in vivo (Paszkowiak, J. J., et al., Arterial wall shear stress: observations from the bench to the bedside. Vascular and endovascular surgery 2003, 37 (1), 47-57). Shear adhesion strength at failure is an indication of the substrate-dependent shear forces against collagen films, porcine aorta, and porcine heart. A schematic lap-shear test assembly is shown in FIG. 7A. The shear adhesion strength of VOLTAGLUE ranged from 10 to 60 kPa, which was 105 times higher than arterial and venous shear stresses. VOLTAGLUE shear adhesion strength compared favorably to DURASEAL®, which provided shear adhesion of 3 to 10 kPa on the same substrates (see FIGS. 7B-7D). VOLTAGLUE demonstrated significantly higher lap-shear adhesion strength than commercially available DURASEAL® sealant on wet tissue substrates.

After the lap shear tests, the freeze-dried tissue specimens were cross-sectioned and assessed for the mechanism of failure and the nature of adhesive fixation. Scanning electron microscopy (SEM) and Masson's trichrome (MT) staining of the interface allowed for demarcation of VOLTAGLUE and an expanded analysis of lumen defect sealing. VOLTAGLUE conformally bonds to the intima layer of the aortic tissues in SEM imaging (not shown). Failure analysis of the SEM cross-section suggested cohesive failure and no underlying damage to the tissues. MT staining showed that expansion of VOLTAGLUE seals the defect site via a plug that extends from the lumen interior (inferior) to the lumen exterior (superior). The expansion results from: (i) VOLTAGLUE foaming via $N_2$, (ii) pressure applied by the inflated balloon, or (iii) combination thereof.

Figure 8:
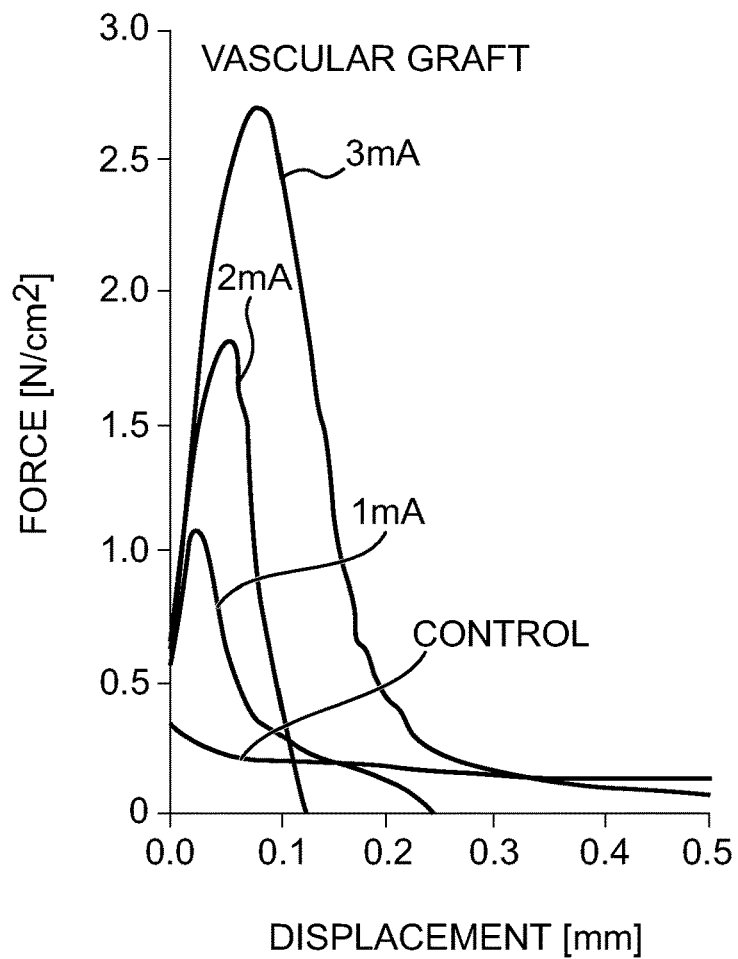
FIG. 8 shows a representative graph of the lap-shear adhesion strength of the ePATCH against the vascular graft at electric currents of 1-3 mA, where Control is no current applied.

Repair of an Ex-Vivo Fistula on Porcine Renal Artery:

VOLTAGLUE and its design within the CATRE/ePATCH system can be used for sealing of arteriovenous (AV) fistulas attached to major arteries or veins. Porcine arteries and synthetic vascular grafts served as ex-vivo and in-vitro arteriovenous fistula models. Engineered fistula models are representative of two different vascular procedures: graft surgeries employing autologous vessels (e.g. thoracic artery) for small-diameter vessels (<6 mm) and synthetic vascular grafts for large-diameter (>6 mm) blood vessels (Pashneh-Tala, S., et al., The Tissue-Engineered Vascular Graft-Past, Present, and Future. Tissue Eng Part B Rev 2016, 22 (1), 68-100). A miniaturized CATRE can repair an ex-vivo renal fistula site by delivering and activating the ePATCH over the 2 mm bifurcation. The fistula sealing procedure in the in-vitro vascular graft fistula model demonstrated the capability of the ePATCH to bond with synthetic graft materials. This may have additional clinical implications as vascular grafting is a routine procedure and VOLTAGLUE can expand in the uneven, coiled troughs (depth ~500 μm) of vascular grafts. The adhesion strength of the ePATCH against the vascular graft was 28 kPa as characterized by lap-shear testing (see FIG. 8) which is ~5 times higher than the commercially available Fibrin sealant employed in graft surgeries.

Figure 9A:
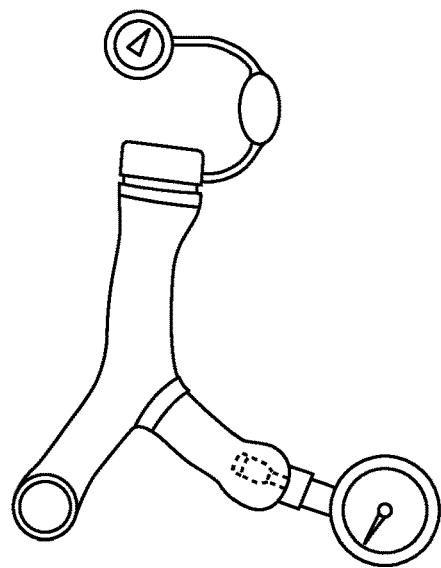
FIG. 9A shows a non-limiting schematic of the custom-made pressure feedback assembly for testing of leak-proof sealing of a fistula defect where a pressure of 225 mm Hg is applied from the source and measured by the pressure sensor connected at the end of the vein-mimicking arm.
Figure 9B:
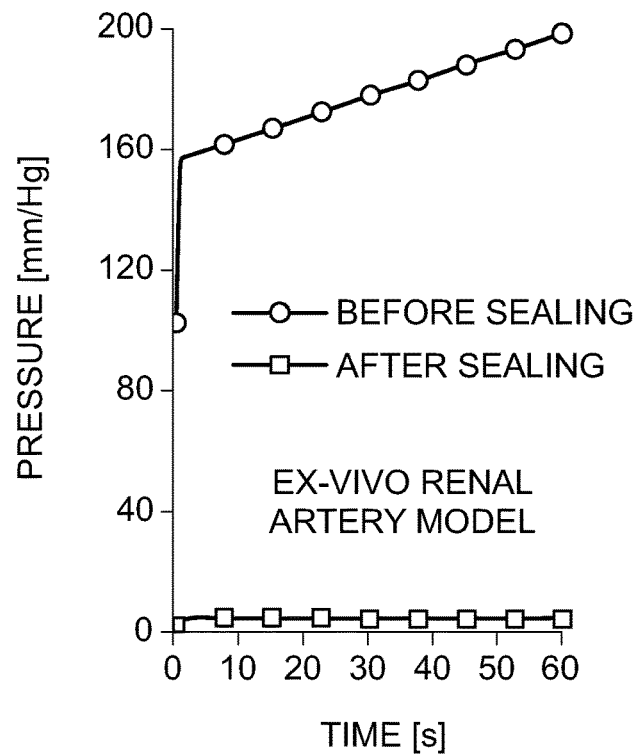
FIG. 9B shows a representative graph of the pressure sensed by the pressure sensor before and after the sealing of the fistula in an ex-vivo artery-based model.
Figure 9C:
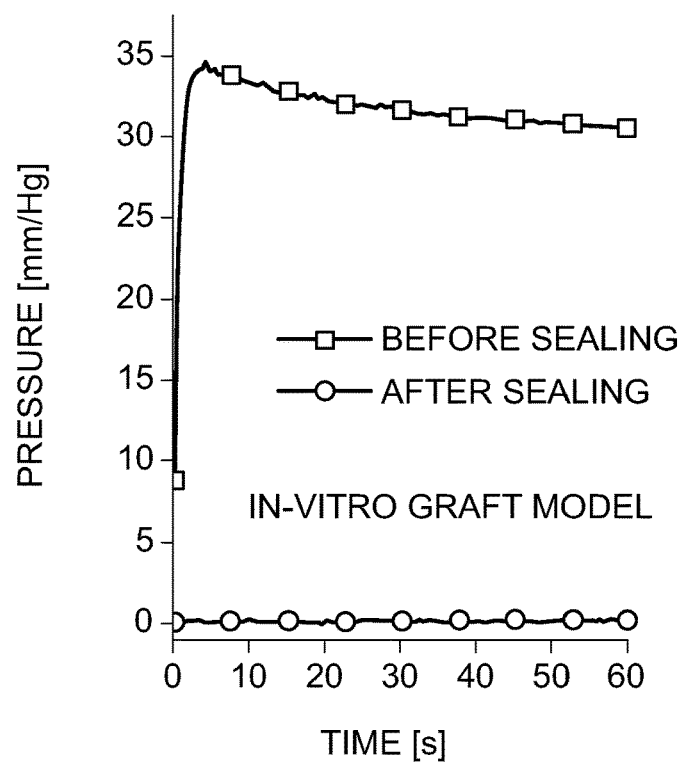
FIG. 9C shows a representative graph of the pressure sensed by the pressure sensor before and after sealing of the fistula in an in-vitro vascular graft-based model.

To investigate leak-proof sealing of the fistula defect, the ex vivo and in vitro models (before and after fistula sealing) were connected to a pressure feedback assembly (see FIG. 9A) via Luer locks. The hydrostatic pressure of 225 mm Hg was applied from a pressure source (mimicking arterial hypertension) and the leaking pressure was measured by a pressure sensor across the vein mimic arm to test ePATCH adhesion. The drop of pressure to ~<5 mm Hg demonstrates a firm sealing of the fistula defect (see FIGS. 9B and 9C).

Figure 10A:
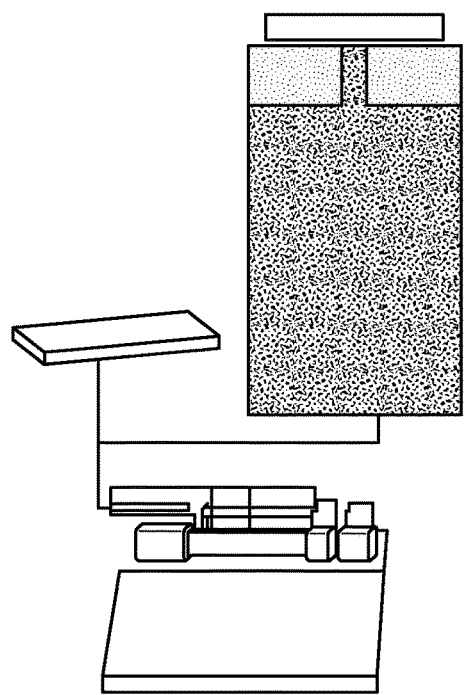
FIG. 10A shows a non-limiting schematic of a test setup to evaluate the burst pressure of the ePATCH after stimulation with 1-3 mA electric current, where Control used was a DURASEAL® commercially-available sealant.
Figure 10B:
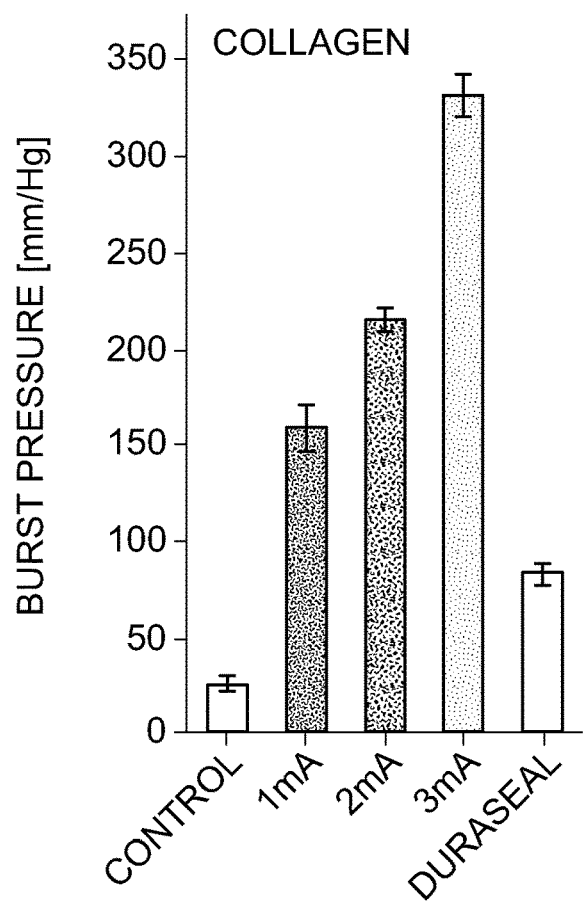
FIG. 10B shows a representative graph of the average burst pressure of the ePATCH against collagen sheets.
Figure 10C:
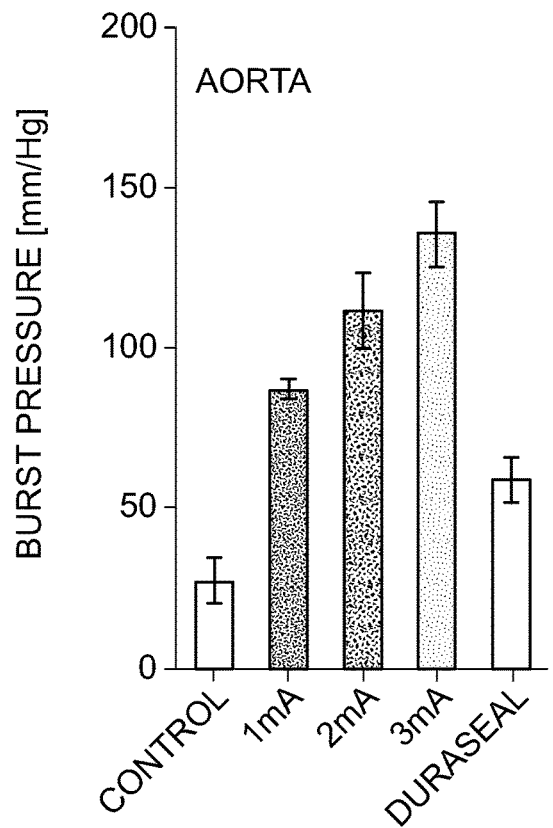
FIG. 10C shows a representative graph of the average burst pressure of the ePATCH patch against porcine aorta.
Figure 10D:
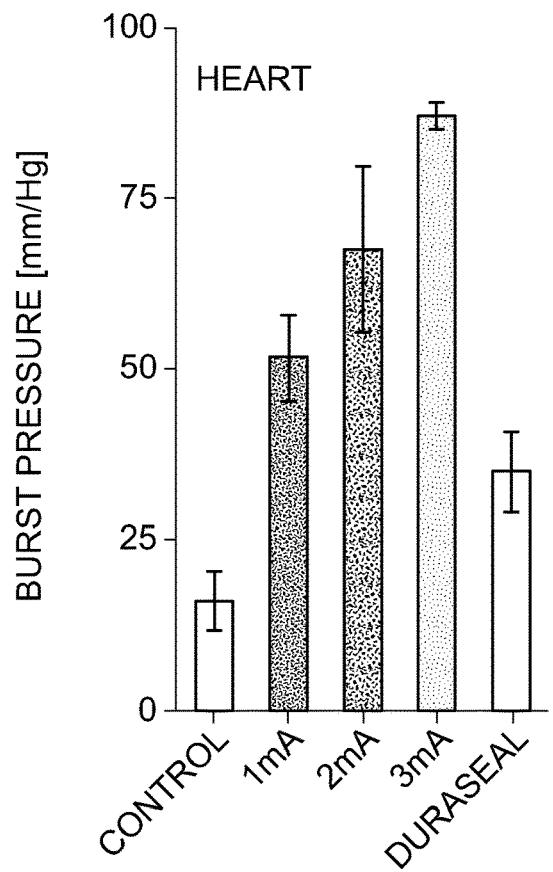
FIG. 10D shows a representative graph of the average burst pressure of the ePATCH patch against porcine heart.

Burst pressure of ePATCH's sealing of tissue defects was evaluated under air or liquid pressures on wet substrates of collagen sheets, porcine aorta, and porcine heart (see FIG. 10A). The burst pressure of the ePATCH against collagen (see FIG. 10B) increased from 150 mm Hg to 225 mm Hg and 350 mm Hg with increasing electric current. The burst pressure of the ePATCH against porcine aorta and heart (see FIGS. 10C and 10D) reached a maximum value of 150 and 90 mm Hg respectively, which is greater than physiological systolic arterial pressure in humans (90 to 130 mmHg).

VOLTAGLUE provided 3 times higher burst pressure than commercially available DURASEAL® sealant against aortic tissues.

Electrocured ePATCH can Withstand Physiological Pressures Under Pulsatile Flow:

The usage of a CATRE for emergency endoscopic procedures, e.g. repair of aortic aneurysms, creates a risk of VOLTAGLUE washout during catheter navigation that has the potential to compromise ePATCH deployment. To test for this possibility, porcine carotid arteries with a 2 mm defect were submerged in heparin-infused porcine blood. The miniaturized CATRE navigates to and seals the defect of the injured carotid artery with the ePATCH. VOLTAGLUE plugs the defect transmurally based on H&E stained carotid arteries (not shown), demonstrating that blood presence does not compromise the electroceutical catheter.

Figure 11:
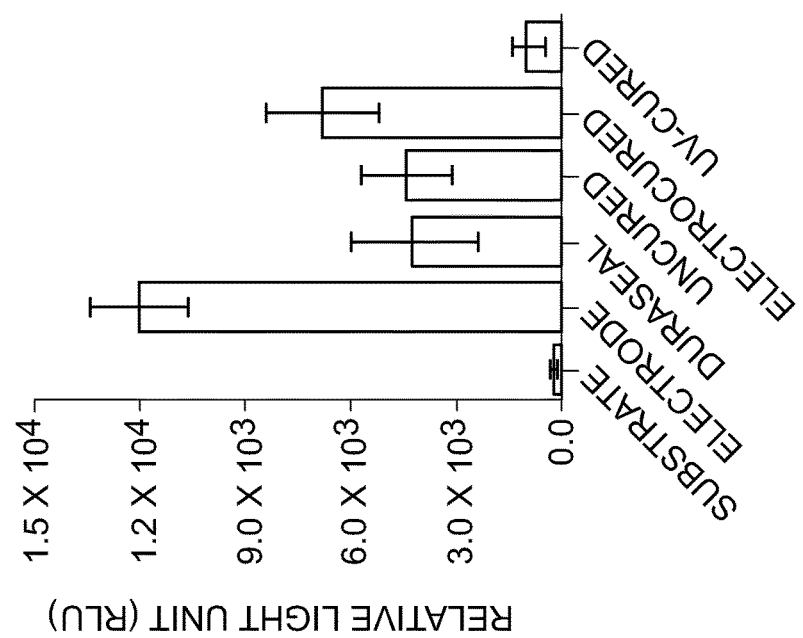
FIG. 11 shows a representative graph of the thrombogenic response of VOLTAGLUE, graphene electrodes, and biocompatible patch as assessed by the lactate dehydrogenase (LDH) colorimetric signal. UV-cured VOLTAGLUE and DURASEAL®, a commercially-available sealant were used as control. The substrate is the only component that would contact the blood inside a lumen

Synthetic materials pose the risk of inducing platelet activation and subsequent clotting when in contact with blood or platelet-rich plasma. Platelet attachment testing via a lactate dehydrogenase assay determines the thrombogenic potential of the VOLTAGLUE, graphene electrodes, and biocompatible substrate (see FIG. 11). DuraSeal® sealant and UV-cured VOLTAGLUE were used as controls. The platelet adhesion of VOLTAGLUE (both cured and uncured) was not significantly different than DURASEAL® control. The biocompatible substrate exhibited 95% reduced platelet adhesion as compared to DURASEAL®. The backing substrate of ePATCH comes into direct blood contact and displayed the lowest thrombogenic potential. The thrombogenic nature of the other ePATCH components accelerated the sealing of the perforated defect.

An aortic leak sealing procedure demonstrates the capacity of the CATRE to close a 3 mm defect on the porcine aorta under a continuous flow of citrate-infused porcine blood. The blood was pumped at a rate of 10 mL min$^{-1}$ through the aorta connected to a mechanical model of heart. The catheter enters in the direction of red arrow and navigates towards the defect site via the mechanical heart. Upon defect sealing, the spliced aorta revealed successful adhesion of the patch over the artificially created defect.

Figure 12:
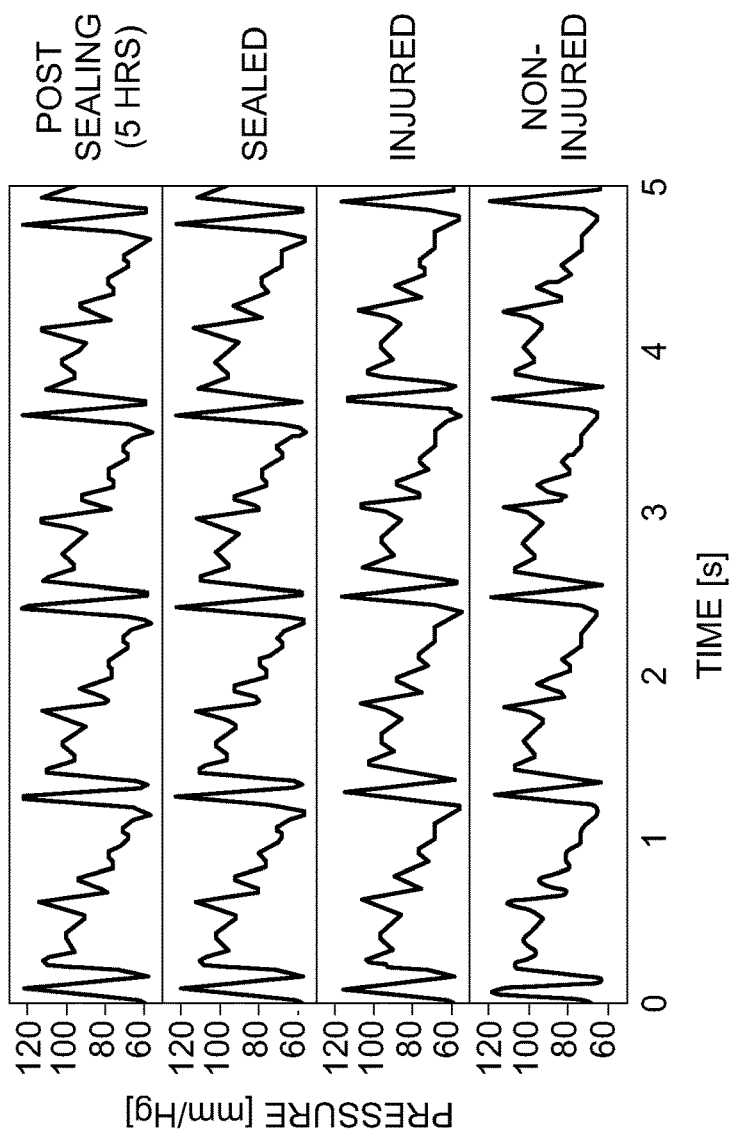
FIG. 12 shows representative graphs of the pressure readings in the collagen tube demonstrating pulsatile flow before defect creation (non-injured), after injury (injured), immediately after closure (sealed) and 5 hours after closure (post sealing).

To check the ability of adhered ePATCH to withstand the physiological pulsatile pressure and shear stresses inside a lumen, a blood mimic fluid (apparent shear viscosity of 3 cP) was pumped at 2 L min$^{-1}$ in a circuit housing a pulsatile pump, a pressure sensor, a fluid reservoir, and a compliance chamber (not shown). A collagen tubing of diameter 3 cm that mimics aorta was connected to the circuit and pulsatile pressures similar to physiological pressure (60-125 mm Hg) were applied. Three 2 mm punchouts served as the defects in the collagen tubing with pressure continuously recorded in real-time. The differential pressure dropped by 18% once injured, as compared to non-injured collagen tubing. After sealing of the three defects by the ePATCH, pressure evaluation continues within the pulsatile flow circuit. The sealed lumen regained the physiological pressure range and FIG. 12 demonstrates a similar blood mimic as measured over 5 hours after sealing. The clinically pertinent results exhibit adhesion to wet substrates which is water-tight, flexible, and stays intact for over 20000 physiologically relevant dynamic stress/strain cycles.

Exogenous Electric Fields do not Affect Endogenous Electrical Activity in an In Vivo Beating Rat Heart:

To assess the interference of external electric fields on the internal electrophysiology, a modified miniaturized catheter was used to electrocure the ePATCH in vivo directly on a live beating rat heart. VOLTAGLUE was activated using CATRE under wet and dynamic conditions for 5 minutes at 3 mA on the rat's epicardial surface. The maximum adhesion strength of ePATCH obtained against the rat's heart was ~12 kPa as measured by lap-shear test (see FIG. 13). This exceeded the adhesion strength provided by Fibrin glue (~5 kPa) in vivo (Yoshida, H., et al. Adhesive strength of autologous fibrin glue. Biological & pharmaceutical bulletin 2000, 23 (3), 313-7).

Figures 13, 14:
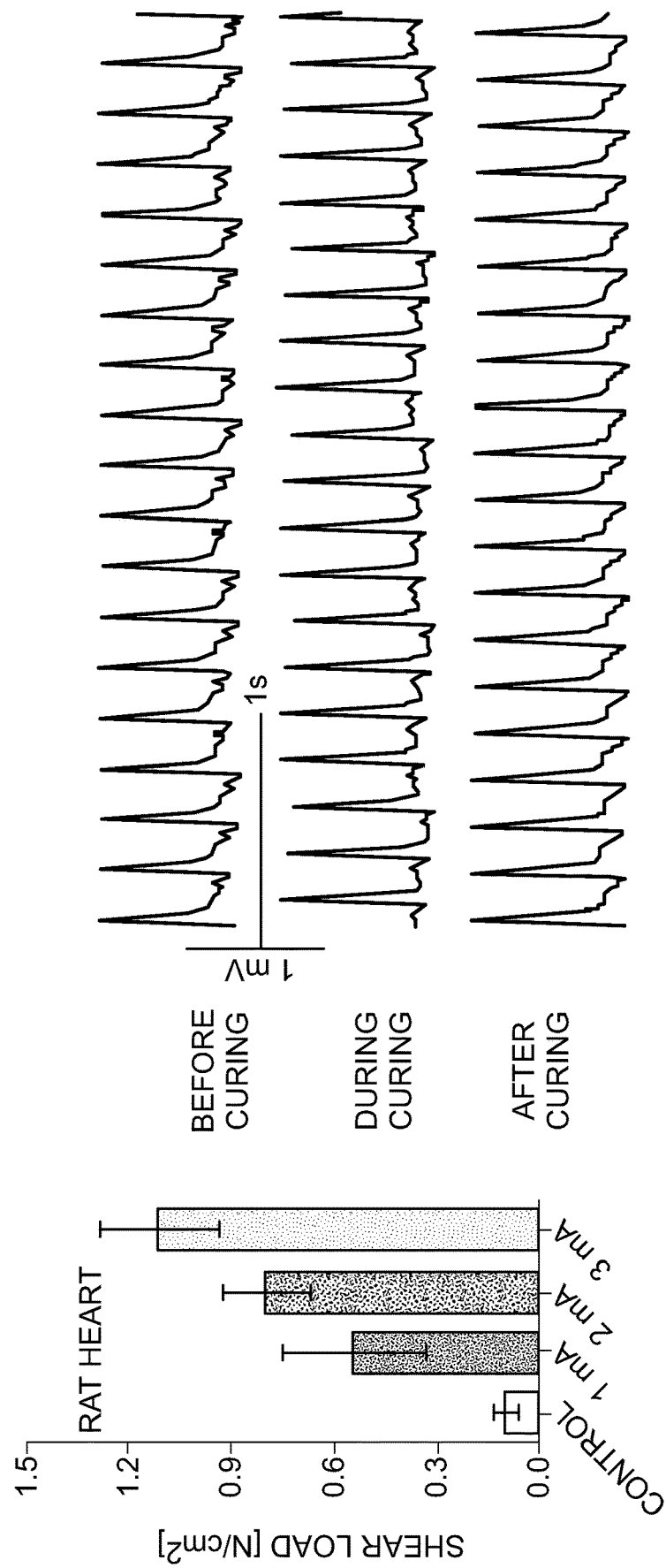
FIG. 13 shows a representative graph of the lap shear adhesion strength of the ePATCH against the rat heart at electric currents of 1-3 mA, as activated by the electroceutical catheter: Control, no current applied.
FIG. 14 shows representative lead II ECG recordings of a Sprague Dawley rat before, during, and after electrocuring.

A lead II ECG recorded the electrical activity of the heart in real-time during the electrocuring (see FIG. 14). The R—R intervals before and during electrocuring were 221±1.7 and 205±2.3 ms, respectively, which lie in the range for normal matured rats (118-251 ms) (Konopelski, P., et al., Electrocardiogram rats: a comparison to human. Physiological research 2016, 65 (5), 717-725). A professional pathologist examined the histological sections (sample blinded) of the explanted rat hearts and concluded that epicardium staining was not associated with any inflammatory cell infiltrate and that the myocardium layer exhibited no cautery/burn injury.

Figure 15C:
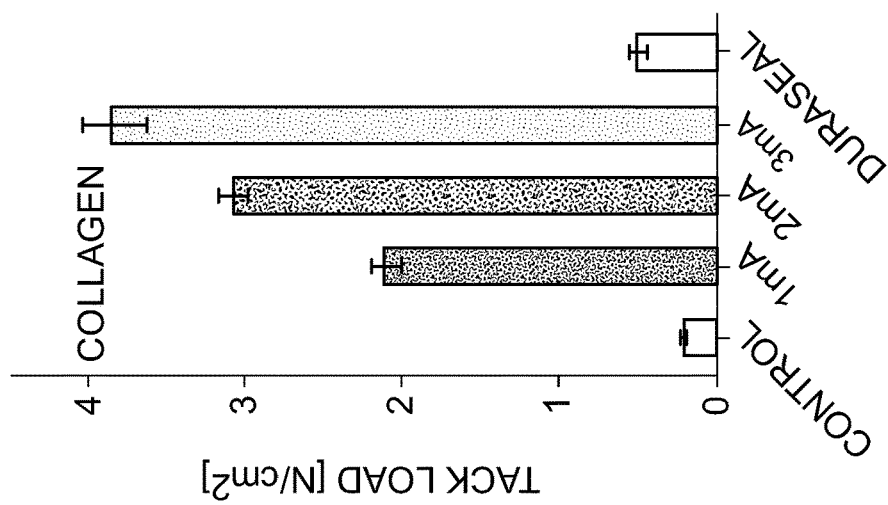
FIG. 15C shows a representative graph of the maximum tack adhesion against collagen sheets.
Figure 15B:
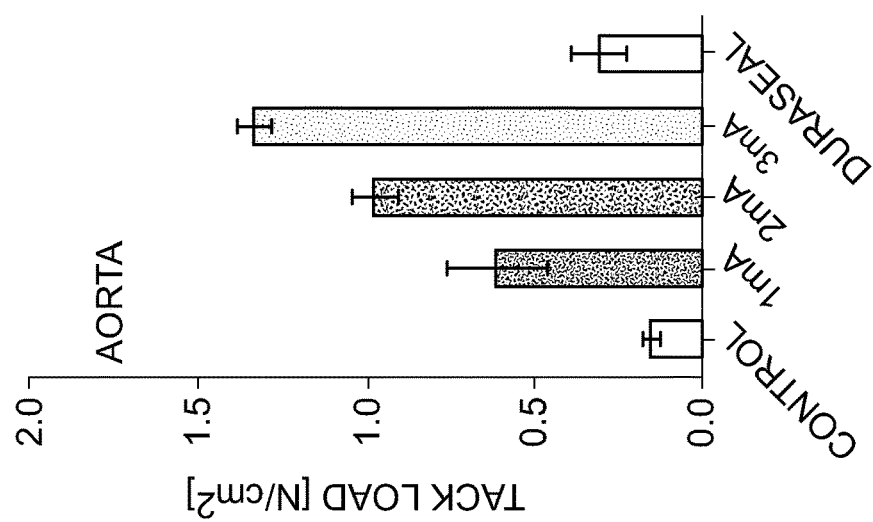
FIG. 15B shows a representative graph of the maximum tack adhesion against porcine aorta.
Figure 15A:
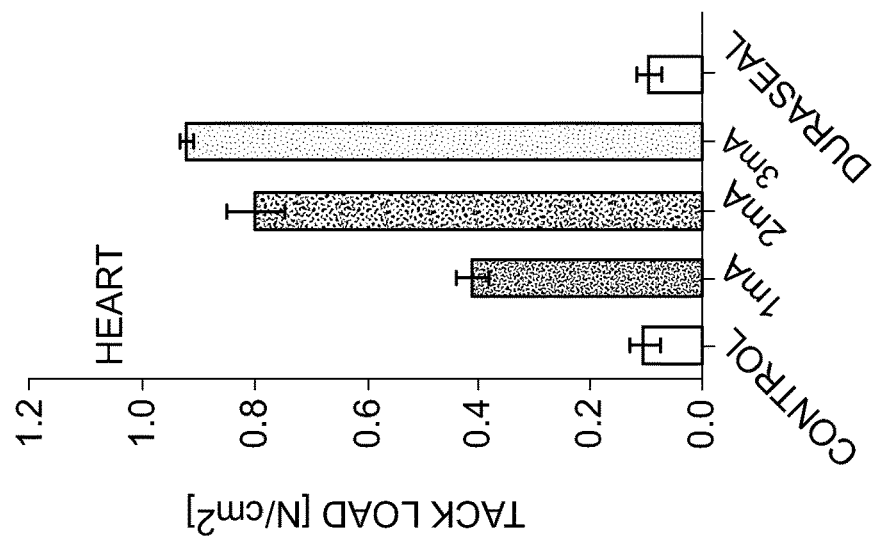
FIG. 15A shows a representative graph of the maximum tack adhesion against the porcine heart tissue.

Tack adhesion strength tests the ability of ePATCH to adhere to the epicardial surface of freshly excised pig hearts. A custom-designed jig immobilized the whole heart to the lower clamp of a mechanical tester (not shown). Tack adhesion strength ranged from 5 to 10 kPa, which is 80-90% stronger than commercially available DURASEAL® sealant (see FIG. 15A). Tack adhesion was used to evaluate the capacity of VOLTAGLUE to bond to porcine aorta and collagen films. VOLTAGLUE reached its maximum adhesion strength of 14 kPa against aorta and 40 kPa against collagen at an electric current of 3 mA. For similar curing times of 5 minutes, the ePATCH against aorta and collagen is about 300% and 700% stronger than a commercially available DURASEAL® sealant (see FIGS. 15B and 15C, respectively). The relatively weaker adhesion of VOLTAGLUE on natural tissue surfaces than synthetic materials may be attributed to the hydrated proteoglycans on tissue surfaces, which can foul carbene insertion.

Discussion

The electroceutical patch and catheter system was tested for lumen repair and contained two main components: (1) the ePATCH: the thin, flexible adhesive patch, and (2) the CATRE: minimally-invasive balloon catheter with retractable electrodes. The ePATCH can be further divided into three subcomponents: (1) VOLTAGLUE: a voltage-activated bioadhesive, (2) Graphene electrodes: cathode and anode made up of nonmetallic, conductive ink, and (3) biocompatible substrate: flexible, elastic, and an electrically insulating thin film. The ePATCH adheres over a lumen defect by electrical activation of VOLTAGLUE and CATRE transports the ePATCH and electric current to activate the VOLTAGLUE intraluminally and on-demand. The catheter delivers and positions the sq. cm size adhesive patch, which can be adhered to both natural and synthetic materials. The CATRE was shown to be able to navigate through a minimum orifice of 7 mm and expand up to 30 mm at the lumen defect location. Given these engineering parameters, the catheter device allows minimally invasive access to defect closures in places including the aorta, intestine, and esophagus. The CATRE can deliver the ePATCH which can be adhered on demand on a defect under both air and liquid mediums, that may have utility of defect sealing in epithelial lumens defects such as those found in the esophagus, trachea, and nose bleeds (epistaxis).

For clinical interfacing, the CATRE can be navigated through a guidewire or guided using endoscope cameras, where guidewires are not preferred, e.g. gastrointestinal tracts. The entire procedure can be performed in two steps: (1) insert and inflate at the target site, and (2) activate, deflate and retract from the body. The cohesive failure of the adhesive allows for failsafe removal with no danger of stripping epithelial or endothelial cell layers.

The CATRE/ePATCH system described throughout and exemplified herein offers a means for soft tissue fixation for endoluminal defect closure. The viscoelastic nature of cured VOLTAGLUE (~ kPa) allows for an intimate, conformal wrapping against the soft, dynamic tissue surfaces. For example, the voltage-activated adhesive can attach the ePATCH against relatively smooth aortic tissues as well as uneven luminal surfaces of synthetic vascular grafts. This is relevant for soft-tissue applications where it is best to avoid tissue compression and stress concentrations that erode soft tissues.

In order to evaluate the CATRE/ePATCH platform's potential for in vivo application, real-world scenarios were tested, including: navigation through tortuous structures of a swine heart, electrocuring on a live beating heart, and repairing defects in swine aorta. The balloon-based design of the catheter allows for pressure-controlled inflation for various diameters (e.g. aorta, carotid arteries, renal arteries, intestines, etc). The CATRE demonstrated a bend radius of 20 mm, thus was easily maneuvered through large lumen vessels (10-30 mm), for example, the medium diameter of curvature of the aorta is 56 mm (Garcia-Herrera, C. M., et al., Bending and pressurisation test of the human aortic arch: experiments, modelling and simulation of a patient-specific case. Computer methods in biomechanics and biomedical engineering 2013, 16 (8), 830-9). The ePATCH, when deployed with CATRE, was also evaluated for bonding biological tissues (e.g. porcine aorta and heart) under lap-shear, tack adhesion, and burst pressure test methods. Electrocured VOLTAGLUE required a higher maximum load at failure, as compared with the DuraSeal® sealant. The ePATCH also withstood physiological systolic pressure of up to 120 mm Hg when bonded to aorta intima. VOLTAGLUE provided 4× stronger shear adhesion and 6× stronger tack adhesion than commercially available DURASEAL® sealant against porcine aorta. Due to its viscous properties, the uncured VOLTAGLUE exhibited minimal surface washout upon exposure to blood flow. The adhered ePATCH withstood systemic pulsatile pressures ranging from 60 to 125 mm Hg, as tested for 5 hours (equivalent to over 20,000 stress/strain cycles). This suggested preclinical applications for the catheter device in transmural defect closures. MT and H&E stained images (not shown) demonstrated that VOLTAGLUE covered and plugged through the defect—which was attributed to the foaming nature of VOLTAGLUE.

The components of the CATRE/ePATCH platform can be independently modified/substituted for ease of application design. For instance, VOLTAGLUE can adhere to a variety of synthetic and natural substrates. VOLTAGLUE, can be replaced with other electrochemically-activated bioadhesives. The electrically conductive patch required to interface current to VOLTAGLUE was made up of graphene ink composite. This ink is chosen because it is partially bioresorbable, as its formulated with 30% degrading polyester (PLGA), but alternative conductive materials for the anode and cathode can also be used. Activation of the VOLTAGLUE was first reported using commercially available three-electrode circuits, but a simplified dual-electrode design was developed. The three-electrode circuits for VOLTAGLUE activation have the advantage of maintaining a constant voltage with a simple potentiostat but their plastic designs cannot be translated to clinical applications. Similar two electrode, graphene interdigitated electrodes can also activate VOLTAGLUE, with positive attributes of flexible, biocompatible components, but the activation is limited to the cathode requiring polarity switching to activate the complete surface of the bioadhesive.

The current design of the ePATCH incorporates a dual electrode geometry that optimizes the cathode area for DC activation, with sufficient surface area essential to seal 2-3 mm lumen defects. The flexible biocompatible substrate for the graphene electrodes can be bioresorbable, leaving no permanent synthetic implants behind (e.g. SurgiWrap®). For a permanent implant fixation application, the bioresorbable patch can be easily replaced by a non-degradable patch (e.g. silicone sheets).

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention. Such equivalents are intended to be encompassed by the following claims.

We claim:

1. A system for treating a tissue defect, comprising:
   (1) an electroceutical patch comprising:
       a biocompatible substrate;
       an anode and a cathode both on a same surface of the biocompatible substrate; and
       an electrochemically initiated bioadhesive coating over the anode and the cathode; and
   (2) a catheter comprising:
       a main shaft optionally comprising a guidewire;
       an anode shaft comprising a retractable metal anode wire;
       a cathode shaft comprising a retractable metal cathode wire;
       a balloon inflation port on the main shaft; and
       an inflatable balloon on an end portion of the catheter;
   wherein the anode and cathode shafts are bonded on diametrically opposite sides of the main shaft;
   wherein the metal anode and cathode wires can each be electrically contacted to an electrical source, external to the system, via the anode and cathode shafts;
   wherein the electroceutical patch is present on the inflatable balloon of the catheter and the metal anode and cathode wires hold the electroceutical patch in an optionally coiled form around the inflatable balloon;
   wherein the metal anode wire contacts the cathode of the electroceutical patch;
   wherein the metal cathode wire contacts the cathode of the electroceutical patch; and
   wherein the electrochemically initiated bioadhesive coating of the electroceutical patch is on the surface of the electroceutical patch opposite the surface which is contacting the inflatable balloon.

2. The system of claim 1, wherein the tissue defect is a lumen defect.

3. The system of claim 2, wherein the lumen defect is an endoluminal defect, a blood vessel defect, an ear canal defect, an aorta defect, a gastrointestinal defect, a broncheal defect, a lymph tissue defect, a tracheal defect, a fistula, a colonoscopic perforation, an esophageal defect, an enterotomy, an intracardiac defect, or an ureterovaginal malformation.

4. The system of claim 1, wherein the biocompatible substrate is flexible and is made of or comprises a polymer, protein, polysaccharide or silicone, wherein the biocompatible substrate has a thickness of between about 10 to about 500 microns, 10 to 250 microns, 10 to 200 microns, 10 to 150 microns, or 10 to 100 microns.

5. The system of claim 4, wherein the electroceutical patch has a surface area of between about 5 mm$^2$ to 2500 mm$^2$.

6. The system of claim 1, wherein the anode and the cathode are formed of a non-metallic conductive material, wherein the non-metallic conductive material comprises graphene, carbon black, and/or carbon nanotubes.

7. The system of claim 6, wherein the non-metallic conductive material is made of or comprises a conductive polymer.

8. The system of claim 1, wherein the electrochemically initiated bioadhesive coating comprises PAMAM-g-diazirine.

9. The system of claim 1, wherein the electrochemically initiated bioadhesive coating comprises one or more biocompatible polymers comprising a plurality of electroactive groups which are derivatives of diazonium, arylsulfonium, and/or diaryliodonium.

10. The system of claim 1, wherein the electrochemically initiated bioadhesive coating has a thickness of between about 1 to 750 microns, 1 to 500 microns, or 1 to 250 microns.

11. The system of claim 1, wherein the retractable metal anode and cathode wires are made of or comprise a shape-memory metal, wherein the shape-memory metal is or comprises a copper-zinc-aluminum alloy, a copper-aluminum-nickel alloy, or an iron-manganese-silicon alloy, optionally wherein the retractable metal anode and cathode wires are each independently joined into flexible metal tubing present in each respective anode and cathode shaft; and plastic tubing secures the retractable metal anode and cathode wires joined to the flexible metal tubing.

12. The system of claim 11, wherein the retractable metal anode and cathode wires made of or comprising the shape-memory metal are deformed from an original straight shape in the system and exposure to an electrical current causes electrical resistance heating which causes the shape-memory metal of the wires to straighten to their original straight shape.

13. The system of claim 1, wherein the main shaft has a diameter of between about 2-15 mm, 2-10 mm, or 2-5 mm or wherein the main shaft has a length of between about 10 cm to 1 meter, 10 cm to 150 cm, 10 cm to 100 cm, 15-50 cm or 15-25 cm.

14. The system of claim 1, wherein the electrical source delivers alternating or direct current to the anode and cathode of the electroceutical patch via the retractable metal anode and cathode wires.

15. The system of claim 1, wherein the inflatable balloon can be inflated/expanded to a diameter of about 5-50 mm via the balloon inflation port using a gas at a pressure of about 5 to 30 atm.

16. The system of claim 1, wherein the catheter can be maneuvered through large lumen vessels having an average diameter of between about 10-50 mm or through small lumen vessels having an average diameter of between about 2-10 mm.

17. The system of claim 1, wherein the catheter has a bending radius as small as about 10, 20, 25, 30, 35, or 40 mm.

18. A method of treating a tissue defect in a subject in need thereof with the system of claim 1, the method comprising the steps of:
   (1) inserting the electroceutical patch and the catheter of the system into the subject in need thereof having the tissue defect;
   (2) delivering the electroceutical patch present on the inflatable balloon of the catheter to the tissue defect;
   (3) inflating the inflatable balloon to press the electroceutical patch onto the tissue defect; where the electroceutical patch covers the tissue defect;
   (4) activating the electrically initiated bioadhesive on the electroceutical patch in order to adhere the electroceutical patch onto the tissue defect;
   wherein activating comprises delivering an electrical current to the anode and the cathode of the electroceutical patch via the retractable metal anode and cathode wires from the electrical source;
   (5) retracting the retractable metal anode and cathode wires from the electroceutical patch adhered to the tissue defect;
   wherein retracting causes the retractable metal anode and cathode wires to separate and disconnect from the electroceutical patch;
   (6) deflating the inflatable balloon; and
   (7) withdrawing the catheter.

19. The method of claim 18, wherein the tissue defect is a lumen defect, and wherein the lumen defect is an endoluminal defect, a blood vessel defect, an ear canal defect, an aorta defect, a gastrointestinal defect, a broncheal defect, a lymph tissue defect, a tracheal defect, a fistula, a colonoscopic perforation, an esophageal defect, an enterotomy, or an ureterovaginal malformation.

20. The method of claim 18, wherein a lumen containing the tissue defect has an average diameter of about 10-50 mm or the lumen containing the tissue defect has an average diameter of about 2-10 mm.

21. The method of claim 18, wherein the electroceutical patch adhered to the tissue defect closes or reduces the size of the tissue defect by at least 75-99.9%, as compared to the size of tissue defect.

22. The method of claim 18, wherein the method comprises a step of visualizing and monitoring the treatment of the tissue defect.

23. The method of claim 18, wherein the method does not comprise any photo-activation step.

24. The method of claim 18, wherein the electroceutical patch adhered to the tissue defect acts as a scaffold for tissue repopulation and healing of the tissue defect.

25. The method of claim 18, wherein the electroceutical patch adhered to the tissue defect has elastic properties which are the same or substantially the same as the tissue having the defect.

26. The method of claim 18, wherein the activating step occurs under air or liquid medium when the electroceutical patch is adhered to the tissue defect.

27. The method of claim 26, wherein the liquid medium has a pulsatile pressure ranging from about 0 to 150 mm Hg when the electroceutical patch is adhered to the tissue defect during the activating step.

28. The method of claim 18, wherein the electroceutical patch adhered to the tissue defect has a shear adhesion strength ranging from between about 3 to 60 kPa.

29. The method of claim 18, wherein the electroceutical patch adhered to the tissue defect has a tack adhesion strength ranging from between about 5 to 50 kPa or 5 to 25 kPa.

30. The method of claim 18, wherein the activating step comprises delivering the electrical current of between about 0.5 to 3.5 mA or 1 to 3 mA for at least about 1 to 10 minutes, 1 to 5 minutes, or 30 seconds to 5 minutes.

31. An electroceutical patch comprising:
   a biocompatible substrate;
   one anode and one cathode both on a same surface of the biocompatible substrate; and
   an electrochemically initiated bioadhesive coating over the anode and the cathode;
   wherein the cathode has a greater surface area than the surface area of the anode.

32. The electroceutical patch of claim 31, wherein the biocompatible substrate is flexible and is made of or comprises a polymer, protein, polysaccharide or silicone.

33. The electroceutical patch of claim 31, wherein the electroceutical patch has a surface area of between about 5 mm$^2$ to 2500 mm$^2$.

34. The electroceutical patch of claim 31, wherein the biocompatible substrate has a thickness of between about 10 to about 500 microns, 10 to 250 microns, 10 to 200 microns, 10 to 150 microns, or 10 to 100 microns.

35. The electroceutical patch of claim 31, wherein the anode and the cathode are formed of a non-metallic conductive material.

36. The electroceutical patch of claim 35, wherein the non-metallic conductive material comprises graphene, carbon black, and/or carbon nanotubes.

37. The electroceutical patch of claim 35, wherein the non-metallic conductive material is made of or comprises a conductive polymer such as PEDOT:PSS, polyacetylene, poly(3-alkyl-thiophene), polyaniline, polyisothianaphthalene, poly-(p-phenylene), poly-(p-phenylene vinylene), polypyrole, polythiophene, or combinations thereof.

38. The electroceutical patch of claim 35, wherein the non-metallic conductive material has an electrical conductivity of at least about 500, 600, 700, or 800 S/m.

39. The electroceutical patch of claim 31, wherein the electrochemically initiated bioadhesive coating comprises PAMAM-g-diazirine.

40. The electroceutical patch of claim 31, wherein the electrochemically initiated bioadhesive coating comprises one or more biocompatible polymers comprising a plurality of electroactive groups which are derivatives of diazonium, arylsulfonium, and/or diaryliodonium.

41. The electroceutical patch of claim 31, wherein the electrochemically initiated bioadhesive coating has a thickness between about 1 to 750 microns, 1 to 500 microns, or 1 to 250 microns.

* * * * *